US012231070B2

United States Patent
Sozer et al.

(10) Patent No.: US 12,231,070 B2
(45) Date of Patent: Feb. 18, 2025

(54) MINIMIZING DC-LINK CURRENT RIPPLE AND ACOUSTIC NOISE, AND REDUCING DC-LINK CAPACITOR REQUIREMENT, FOR ELECTRIC MOTORS

(71) Applicant: The University of Akron, Akron, OH (US)

(72) Inventors: Yilmaz Sozer, Peninsula, OH (US); Omer Gundogmus, Niskayuna, NY (US); Md Ehsanul Haque, Akron, OH (US); Anik Chowdhury, Akron, OH (US); Shuvajit Das, Sterling Heights, MI (US)

(73) Assignee: THE UNIVERSITY OF AKRON, Akron, OH (US)

( * ) Notice: Subject to any disclaimer, the term of this patent is extended or adjusted under 35 U.S.C. 154(b) by 101 days.

(21) Appl. No.: 18/031,042

(22) PCT Filed: Oct. 8, 2021

(86) PCT No.: PCT/US2021/054181
§ 371 (c)(1),
(2) Date: Apr. 10, 2023

(87) PCT Pub. No.: WO2022/076825
PCT Pub. Date: Apr. 14, 2022

(65) Prior Publication Data
US 2023/0378892 A1    Nov. 23, 2023

Related U.S. Application Data

(60) Provisional application No. 63/089,615, filed on Oct. 9, 2020.

(51) Int. Cl.
*H02P 6/10*     (2006.01)
*H02P 21/20*    (2016.01)
(Continued)

(52) U.S. Cl.
CPC ............... *H02P 6/10* (2013.01); *H02P 21/20* (2016.02); *H02P 21/22* (2016.02); *H02P 27/08* (2013.01)

(58) Field of Classification Search
CPC ...... H02P 6/10; H02P 6/08; H02P 6/04; H02P 6/28; H02P 21/00; H02P 21/0003;
(Continued)

(56) References Cited

U.S. PATENT DOCUMENTS

2002/0063547 A1    5/2002   Turner et al.
2016/0329852 A1    11/2016  Bouallaga et al.
(Continued)

FOREIGN PATENT DOCUMENTS

| | | |
|---|---|---|
| CN | 103684117 A | 3/2014 |
| DE | 102011088915 A1 | 6/2013 |

OTHER PUBLICATIONS

Extended European Search Report for corresponding application EP 21878619.2; dated Sep. 9, 2024.

*Primary Examiner* — Antony M Paul
(74) *Attorney, Agent, or Firm* — RENNER KENNER GREIVE BOBAK TAYLOR & WEBER

(57) ABSTRACT

A method performed by a controller of an electric motor, including generating control parameters, the step of generating control parameters selected from: inputting a given reference torque ($T_{ref}$) and a speed command to a torque generation lookup table (LUT) such that the step of generating the control parameters includes the torque generation lookup table at the given reference torque and the speed command; or utilizing an analytical model that includes one or more analytical equations or one or more functions; inputting the control parameters to a DC-link current ripple, torque ripple, and radial force ripple minimization lookup table; inputting position to the DC-link current ripple, torque ripple, and radial force ripple minimization lookup table;

(Continued)

generating a reference current profile from the DC-link current ripple, torque ripple, and radial force ripple minimization lookup table; and inputting the reference current profile to the electric motor. Additional methods are disclosed.

20 Claims, 24 Drawing Sheets

(51) Int. Cl.
*H02P 21/22* (2016.01)
*H02P 27/08* (2006.01)
(58) Field of Classification Search
CPC ...... H02P 21/0025; H02P 21/02; H02P 21/14; H02P 21/20; H02P 21/22; H02P 21/30; H02P 23/0004; H02P 23/07; H02P 23/14; H02P 23/28; H02P 27/08; H02P 25/092; H02P 25/08; H02P 29/50
See application file for complete search history.

(56) References Cited

U.S. PATENT DOCUMENTS

| | | |
|---|---|---|
| 2017/0257043 A1 | 9/2017 | Lorilla |
| 2020/0091848 A1 | 3/2020 | Manderla et al. |
| 2020/0412292 A1* | 12/2020 | Hayashi ............... H02M 1/143 |

* cited by examiner

MINIMIZING DC-LINK CURRENT RIPPLE AND ACOUSTIC NOISE, AND REDUCING DC-LINK CAPACITOR REQUIREMENT, FOR ELECTRIC MOTORS

CROSS-REFERENCE TO RELATED APPLICATIONS

This application claims the benefit of U.S. Provisional Application No. 63/089,615, filed on Oct. 9, 2020, which is incorporated herein by reference.

FIELD OF THE INVENTION

Embodiments of the present invention relate to a technique for reduction of DC-link current ripple, torque ripple, and radial force ripple, along with force harmonic elimination, by injecting optimal phase currents obtained from current profiling. Embodiments of the present invention relate to an interleaving technique for reducing the DC-link capacitor requirement. Embodiments of the present invention relate to a technique for mode shape selection for more focused radial force control. Embodiments of the present invention may be particularly suitable for electric motors, such as switched reluctance motors (SRM), particularly for a controller thereof.

BACKGROUND OF THE INVENTION

Certain electric motors, such as switched reluctance motors (SRM) exhibit high-temperature adaptability, fault tolerance capabilities, rugged structure, inherent flux weakening capabilities, and competitive torque density as generally compared to the permanent magnet synchronous machine (PMSM). SRM have a simpler structure and are easier to manufacture at low cost, which makes them attractive in many industrial applications such as aerospace, automotive, research, and domestic appliance manufacturing.

High vibration and acoustic noise are dominant drawbacks of SRM. Two main reasons for SRM noise are mechanical and electromagnetic origins. Sources for mechanical noises are bearing vibration, installation problems, non-uniform characteristics of materials, and manufacturing asymmetries. Electromagnetic cause of acoustic noise in SRM can be the radial force generated by armature excitation which leads to radial deformation of the stator. In a radial SRM, when a phase is excited, the magnetic flux from the excited stator pole crosses the air gap in a radial direction producing large radial forces on the excited stator poles. This radial force deforms the stator into an oval shape. The radial deformation along with the lateral rocking of the stator poles produces radial vibration of the stator, leading to high acoustic noise in SRM. When phases of SRM are energized and de-energized periodically, the rise and fall of radial force and torque generates ripple.

High torque ripple and DC-link current ripples are major concerns in various SRM drive applications. High DC-link current ripple requires a higher DC link capacitor to eliminate low-frequency harmonics in the battery. A bulkier capacitor in the drive unit causes a significant increase in cost and volume.

Various control algorithms have been proposed for reducing the DC-link ripple. Similarly, to reduce torque ripple, different control strategies have been proposed, which include utilizing commutation angle optimization, current profile optimization, torque sharing function, fuzzy logic, and DQ control. Others have also aimed to reduce both torque and radial force ripple simultaneously with control strategies. Still other efforts have included a comprehensive framework for multi-objective optimization to reduce torque and radial force ripple and a control optimization-based current profiling method to reduce the torque ripple and vibration for SRM.

While these previously proposed controllers may achieve certain objectives, they are also believed to hinder the performance of other metrics. For example, reduction in DC-link current ripple might impose higher torque ripple or acoustic noise on the drive operation.

Other general disadvantages of SRM can include the nonlinear characteristics and system operation of SRM causing high DC-link current ripple at the input side, which might thereby require higher DC bus capacitance. Existing efforts in this regard have included attempts at controlling the stored field energy and the instantaneous torque at the same time to thereby reduce the requirement of DC-link capacitor. But the requirement of excessive overlap between the phase currents generally increases the RMS current, subsequently resulting in winding losses.

Other efforts have included the use of integrated multiport and quasi Z-source converter based power decoupling topologies to reduce the capacitance requirement in the DC-link. Also, the effects of using a DC-DC converter to reduce the size of the DC-link capacitor by active filtering of the source current has been investigated. Moreover, another effort included introducing a power decoupling technique in parallel with the DC-bus to reduce the amount of DC-link capacitor. However, these efforts generally require an additional hardware, which increases the cost, size, and complexity of the system.

In another existing effort, a hysteresis current controller (HCC) based synchronized phase commutation scheme was proposed to reduce the current peaks to or from the DC bus. This method sacrifices the output torque ripple performance to reduce the DC-link capacitor requirement. In another effort, a DC-link voltage control method was proposed to reduce the DC-link capacitor requirement. Other efforts included phase current shaping methods for reduce the DC-link capacitor requirement. However, in these methods, the magnetic energy of a phase is not fed back into the DC-link capacitor but temporarily stored inside the machine phase. This has the impact of increasing the current stress on the inverter switches and the motor phase windings.

A still further effort included a bus peak current control strategy that sought to ensure the harmonic content of the DC-link current is concentrated in the switching frequency ($f_{SW}$) range to reduce the DC-link capacitor requirement. Also, a fixed switching frequency predictive current control (FSFPCC) strategy has been proposed. Although FSFPCC can generally assist with the harmonic content of the DC-link current being concentrated in the switching frequency ($f_{SW}$) range, a significant capacitor requirement is generally needed to eliminate the switching frequency ($f_{SW}$) content.

There remains a need in the art for a strategy to minimize DC link current ripple, torque ripple, and acoustic noise simultaneously. It also remains desirable to reduce the DC-link capacitor requirement for electric motor drives.

SUMMARY OF THE INVENTION

An embodiment of the present invention provides a method performed by a controller of an electric motor, the method comprising steps of: generating control parameters, wherein the step of generating control parameters is selected from: inputting a given reference torque ($T_{ref}$) and a speed command to a torque generation lookup table (LUT) such that the step of generating the control parameters includes the torque generation lookup table at the given reference torque and the speed command; or utilizing an analytical model that includes one or more analytical equations or one or more functions; inputting the control parameters to a DC-link current ripple, torque ripple, and radial force ripple minimization lookup table; inputting position to the DC-link current ripple, torque ripple, and radial force ripple minimization lookup table; generating a reference current profile from the DC-link current ripple, torque ripple, and radial force ripple minimization lookup table; and inputting the reference current profile to the electric motor.

A second embodiment provides a method as in any embodiment above, wherein the reference current profile is an optimal reference current profile.

A third embodiment provides a method as in any embodiment above, wherein the control parameters include commutation angles $\theta_{on}$ and $\theta_{off}$ and a reference current $I_{ref}$.

A fourth embodiment provides a method as in any embodiment above, wherein the step of generating the reference current profile is offline prior to operation of the electronic motor.

A fifth embodiment provides a method as in any embodiment above, wherein the step of inputting the reference current profile includes injecting an optimum current waveform and a constant reference current.

A sixth embodiment provides a method as in any embodiment above, wherein the step of generating the reference current profile includes a plurality of iterative steps.

A seventh embodiment provides a method as in any embodiment above, wherein the step of generating the reference current profile includes control based current profiling.

An eighth embodiment provides a method as in any embodiment above, wherein the control based current profiling includes providing DC-link current, torque, and radial force inputs to a band pass filter (BPF) to thereby obtain DC-link current ripple, torque ripple, and radial force ripple outputs, and providing the DC-link current ripple, torque ripple, and radial force ripple outputs to a global multi-objective optimization step.

A ninth embodiment provides a method as in any embodiment above, wherein the global multi-objective optimization step includes a fitness function defined by Formula (9):

$$F_{fitness} = w_1 f_1 + w_2 f_2 + w_3 f_3 \quad \text{Formula (9)}$$

where $w_1$, $w_2$, and $w_3$ are user-input weights for objectives of the DC-link current ripple, torque ripple, and radial force ripple, respectively, and $f_1$, $f_2$ and $f_3$ are fitness values for objectives of the DC-link current ripple, torque ripple, and radial force ripple, respectively, wherein $w_1$, $w_2$, and $w_3$ and $f_1$, $f_2$ and $f_3$ include initial values, and wherein $w_1$, $w_2$, and $w_3$ and $f_1$, $f_2$ and $f_3$ can be modified from the initial values during operation of the electric motor.

A tenth embodiment provides a method as in any embodiment above, wherein the modification of $w_1$, $w_2$, and $w_3$ and $f_1$, $f_2$ and $f_3$ is based on a different operating speed or a different torque condition.

An eleventh second embodiment provides a method as in any embodiment above, wherein the global multi-objective optimization step includes minimizing the fitness function to thereby minimize the DC-link current ripple, torque ripple, and radial force ripple.

A twelfth embodiment provides a method as in any embodiment above, wherein the step of generating the reference current profile includes current harmonic injection.

A thirteenth embodiment provides a method as in any embodiment above, wherein the current harmonic injection includes providing DC-link current, torque, and radial force inputs to a band pass filter (BPF) to thereby obtain DC-link current ripple, torque ripple, and radial force ripple outputs; providing the radial force input to a Fast Fourier transform (FFT) block to thereby provide harmonic contents of the radial force; and providing the DC-link current ripple, torque ripple, radial force ripple outputs and the harmonic contents of the radial force to a global multi-objective optimization step.

A fourteenth embodiment provides a method as in any embodiment above, wherein the global multi-objective optimization step includes a function defined by Formula (23):

$$\min R(C(A_m, \varphi_m)) = w_1 Idc_{ripple}(C(A_m, \varphi_m)) + w_2 T_{ripple}(C(A_m, \varphi_m)) + w_3 F_{ripple}(C(A_m, \varphi_m)) + w_4 FFT_{fi}(F_{ripple}(C(A_m, \varphi_m))) \quad \text{Formula (23)}$$

where $C(A_m, \varphi_m)$ is the decision variables which has current injection harmonic coefficients; $w_1$, $w_2$, $w_3$, and $w_4$ are weighting factors; $FFT_{fi}$ is the radial force harmonic component at frequency $f_i$, $Idc_{ripple}$ is DC-link current ripple, $T_{ripple}$ is torque ripple, and $F_{ripple}$ is radial force ripple.

A fifteenth embodiment provides a method as in any embodiment above, wherein the global multi-objective optimization step includes minimizing the function of Formula (23) to thereby minimize the DC-link current ripple, torque ripple, and radial force ripple.

A sixteenth embodiment provides a method as in any embodiment above, wherein the electric motor is a switched reluctance motor, the method further comprising a step of interleaved fixed switching frequency predictive current control that includes a phase shift ($\delta_{AB}$) between carrier signals of upper switches in a Phase A and a Phase B being kept at 180° to implement an interleaving strategy when an operating region of the switched reluctance motor is the Phase A and Phase B region.

A seventeenth embodiment provides a method as in any embodiment above, wherein the step of interleaved fixed switching frequency predictive current control further includes a phase shift ($\delta_{BC}$) between the carrier signals of the upper switches in the Phase B and a Phase C being kept at 180° to implement an interleaving strategy when the operating region of the switched reluctance motor is the Phase B and Phase C region; and a phase shift ($\delta_{CA}$) between the carrier signals of the upper switches in the Phase C and the Phase A being kept at 180° to implement an interleaving strategy when the operating region of the switched reluctance motor is the Phase C and Phase A region.

An eighteenth second embodiment provides a method as in any embodiment above, further comprising a step of mode shape selection for the radial force to thereby achieve improved radial force control.

A nineteenth embodiment provides a method as in any embodiment above, wherein the step of mode shape selection includes calculating spatial and temporal distribution of airgap force during dynamic simulations through an additional lookup table; performing 1D (spatial)-FFT to identify a dominant spatial order of the airgap force; determining temporal orders associated with the dominant spatial order; feeding the temporal orders through a proportional integral (PI) controller into a reference current generation; and optimizing gains of the PI controller through a multi-physics vibration synthesis.

A twentieth embodiment provides a method as in any embodiment above, wherein the temporal orders include Mode 0 and Mode 6.

A twenty-first embodiment provides a method performed by a controller of a switched reluctance motor, the method comprising a step of interleaved fixed switching frequency predictive current control including a phase shift ($\delta_{AB}$) between carrier signals of upper switches in a Phase A and a Phase B being kept at 180° to implement an interleaving strategy when an operating region of the switched reluctance motor is the Phase A and Phase B region; a phase shift ($\delta_{BC}$) between the carrier signals of the upper switches in the Phase B and a Phase C being kept at 180° to implement an interleaving strategy when the operating region of the switched reluctance motor is the Phase B and Phase C region; and a phase shift ($\delta_{CA}$) between the carrier signals of the upper switches in the Phase C and the Phase A being kept at 180° to implement an interleaving strategy when the operating region of the switched reluctance motor is the Phase C and Phase A region.

A twenty-second embodiment provides a method performed by a controller of an electric motor, the method comprising a step of mode shape selection including calculating spatial and temporal distribution of airgap force during dynamic simulations through a lookup table; performing 1D (spatial)-FFT to identify a dominant spatial order of the airgap force; determining temporal orders associated with the dominant spatial order, wherein the temporal order include Mode 0 and Mode 6; feeding the temporal orders through a proportional integral (PI) controller into a reference current generation; and optimizing gains of the PI controller through a multi-physics vibration synthesis.

A twenty-third embodiment provides a method as in any embodiment above, wherein the electric motor is a reluctance motor.

A twenty-fourth embodiment provides a method as in any embodiment above, wherein the electric motor is a switched reluctance motor.

A twenty-fifth embodiment provides a method as in any embodiment above, wherein the electric motor is a synchronous reluctance motor.

A twenty-sixth embodiment provides a method as in any embodiment above, wherein the electric motor is a permanent magnet motor.

DETAILED DESCRIPTION OF ILLUSTRATIVE EMBODIMENTS

Advantages of the present invention will become better understood with regard to the following description, appended claims, and accompanying drawings wherein:

DETAILED DESCRIPTION OF ILLUSTRATIVE EMBODIMENTS

Figure 1:
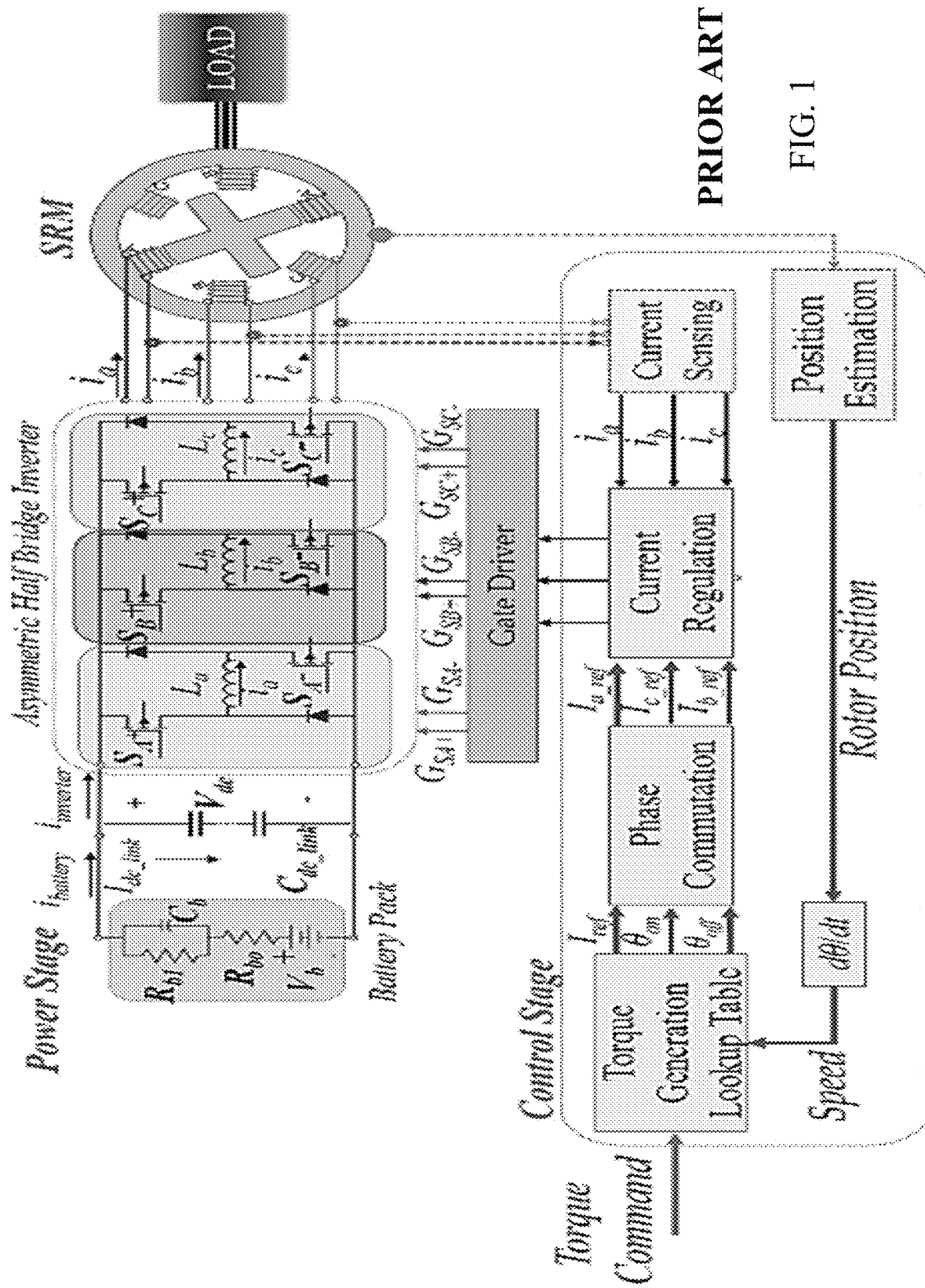
FIG. 1 is a block diagram of a conventional controlled drive.

One or more embodiments of the present invention relate to a technique for simultaneous DC-link current ripple, torque ripple, and radial force ripple reduction and force harmonic elimination. These benefits can be achieved by injecting optimal phase currents obtained from a current profiling method using a multi-objective optimization technique, all while maintaining the output performance of the machine. The current profiling method may be one or more of a control based current profile method and a current harmonic injection method. A user can select certain weighting for different objectives in the current profiling method depending on the desired application. The current harmonic injection method generally includes injecting harmonics to the motor phase currents to suppress dominant radial force harmonics, reduce DC-link current torque, and radial force ripple. Advantageously, specific harmonics of the radial force that are more dominant in generation of the acoustic noise and vibration can be minimized. Moreover, the current profiles can be analyzed globally using a multi-objective optimization technique. In addition to efficient and reliable drive operation, a controller of embodiments of the present invention can generate optimum current profiles at a wide range of operational speeds.

One or more embodiments of the present invention relate to an interleaving technique for reducing the DC-link capacitor requirement for electric motor drives, such as switched reluctance motor (SRM) drives. The interleaving technique can reduce the dominant harmonic content of the DC-link current, concentrated around twice switching frequency ($2f_{SW}$), which in turn can reduce the DC-link capacitor requirement. The interleaving technique also enables lowering the switching frequency of the converter for achieving higher system efficiency while maintaining relatively low DC-link capacitor requirement. As a further advantage, the interleaving technique does not require phase current shaping which ensures no additional current stress on the inverter switches and the motor phase windings. Furthermore, there is generally not a need for an additional hardware in order to implement the interleaving technique.

One or more embodiments of the present invention relate to mode shape selection for the radial force in order to achieve a more focused radial force control. This technique includes spatial and temporal distribution of airgap forces being calculated during dynamic simulations through a look up table-based approach. The dominant spatial order of the airgap force is identified by 1D (spatial)-FFT. Temporal orders associated with the dominant spatial orders are fed through a proportional integral (PI) controller into the reference current generation. And gains of the PI controller are optimized through a multi-physics vibration synthesis approach. Advantageously, since the total radial force ripple is not being fed to the controller, the peak phase current due to profiling can be comparatively lower. This technique also results in noise, vibration, and harshness (NVH) mitigation.

As mentioned above, one or more embodiments relate to a technique for simultaneous DC-link current ripple, torque ripple, and radial force ripple reduction and force harmonic elimination. This technique may also be referred to as phase current shaping or generating a phase current profile. This technique includes weighting for certain objectives, where the weights can be adjusted to give importance to one objective or another. The resultant current waveforms can then be adjusted in order to achieve all desired objectives. The technique also minimizes impact on the torque per ampere performance of SRM. Reducing the radial force ripple along with the torque ripple also tends to reduce the acoustic noise reduction in SRM. Moreover, if the radial force has harmonic components around the natural frequencies of machine, the present technique will have a significant effect at those frequencies.

Electric motors, such as switched reluctance motors, are generally known to the skilled person, though certain details relative to switched reluctance motors will be explained herein. Switched reluctance motors are electric motors that run by reluctance torque, where power is delivered to windings in the stator rather than the rotor. SRM phases are excited sequentially to generate an electromagnetic torque without any interruption. Once the phase is excited, the rotor pole closest to the excited stator pole rotates to minimize the reluctance of the flux path by overlapping with the excited stator pole.

Certain details relative to acoustic noise principles and electromagnetic analysis for dynamic modeling are now explained. The maximum amount of magnetic flux flows from an excited stator pole to a rotor pole when the rotor pole is completely aligned with the stator pole and hence exerts a maximum amount of electromagnetic force. The electromagnetic force F has two components; the tangential force $F_t$ and the radial force $F_r$. Torque is generated by the tangential part of the electromagnetic force between the stator and the rotor, which also causes tangential vibration on the stator teeth. However, the radial force is the main cause of vibration. Considering a three-phase machine, the radial force on the stator poles for phase A, B, and C are assigned as $f_{rA}$, $f_{rB}$, and $f_{rC}$, respectively.

The summation of the radial force generated with the excitation of the three phases can be considered as an algebraic sum of all the forces, as shown in Formula (1).

$$f_{r\_sum} = f_{rA} + f_{rB} + f_{rC} \quad \text{Formula (1)}$$

The air gap forces can be calculated by Maxwell stress tensor T as shown in Formula (2), $$T = \frac{1}{\mu_0}\left[(\vec{B}\cdot\hat{n})\vec{B} - \frac{1}{2}\nabla B^2 \hat{n}\right] \quad \text{Formula (2)}$$

where B is magnetic flux density, $\mu_0$ is the permeability of free space, and $\hat{n}$ is the unit normal vector. The force F is calculated along the line integral of the surface (ds) as shown in Formula (3).

$$F = \int T \, ds \quad \text{Formula (3)}$$

As mentioned above, force F includes tangential $F_t$ and radial forces $F_r$ components as further presented in Formula (4) and Formula (5), $$F_t = \iint \frac{1}{\mu_0}(\vec{B}\cdot\hat{n})\vec{B}\,ds = \frac{1}{\mu_0}\iint \vec{B}_r\vec{B}_t\,ds \qquad \text{Formula (4)}$$

$$F_r = \iint \frac{1}{2\mu_0}\nabla B^2\hat{n} = \frac{1}{2\mu_0}\iint (B_r^2 - B_t^2)\,ds \qquad \text{Formula (5)}$$

where $B_r$ and $B_t$ are the radial and tangential components of the flux density.

Certain details relative to conventional control techniques are now explained. Inverter topology of the SRM differs from other AC drives due to the phases operating independently, which can be achieved through asymmetric half-bridge structure (AHB). FIG. 1 shows the hardware structure of a conventional drive along with the control block diagram. The torque command from the outer controller is converted into the reference current and the commutation angles through a predetermined lookup table (LUT). The resolver connected to the SRM shaft measures the position of the rotor for the phase commutation and speed estimation. The current control block regulates the phase current by generating the gate switch signals for the inverter. Phase current sensors provide current measurements to the current controller block for closed-loop current regulation.

While the conventional control technique shown in FIG. 1 uses constant reference currents throughout the phase excitation, a control technique of one or more embodiments of the present invention aims to shape the reference current for different objectives. The control-based technique aims to find the optimal current shape, which reduces the DC-link, torque, and radial force ripple. This thereby minimizes vibration and acoustic noise while keeping the torque within the desired range.

Figure 2:
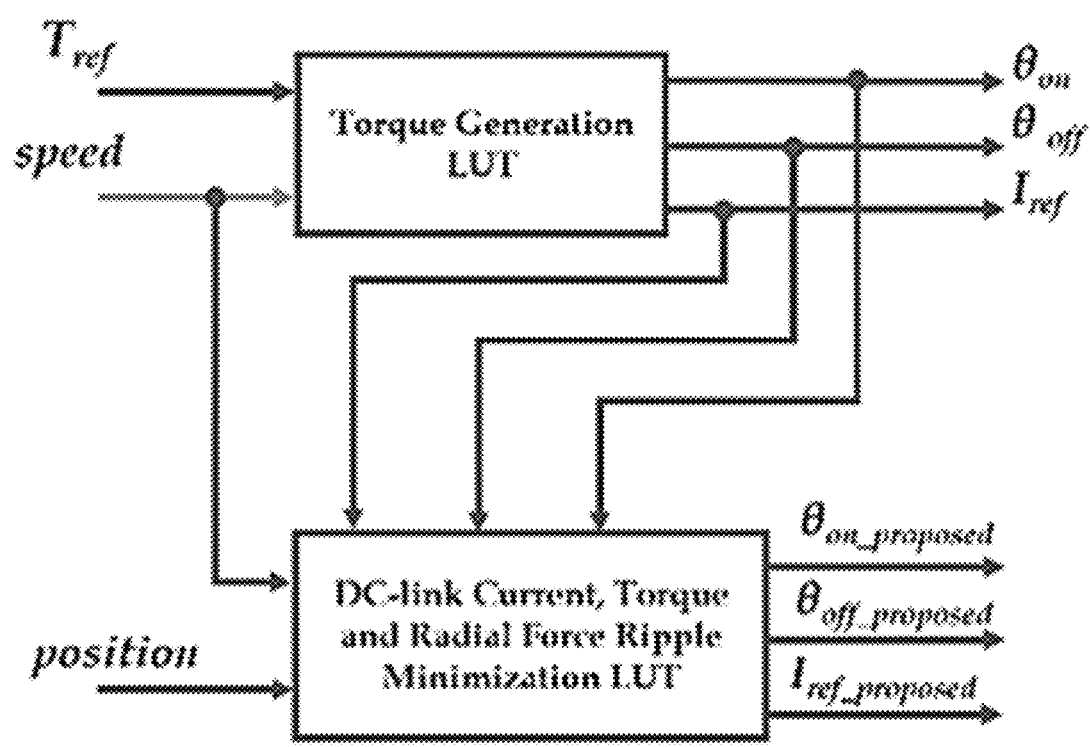
FIG. 2 is a block diagram of a current profile generation technique according to one or more embodiments of the invention.

With reference to FIG. 2, FIG. 2 shows the incorporation of a current profiling technique into an existing control system, according to one or more embodiments of the present invention. The conventional torque control method generates control parameters ($I_{ref}$, $\theta_{on}$, $\theta_{off}$) with a torque generation lookup table (LUT) at a given reference torque ($T_{ref}$) and speed command. $I_{ref}$ is also obtained from the reference current-torque-speed LUT. Optimal values for the commutation angles can then be determined iteratively over an allowable range. In one or more embodiments, an analytical model that includes one or more analytical equations and/or one or more functions can be utilized in place of the torque generation lookup table (LUT). Where utilized, the analytical model may be said to relate the torque to the reference current and the angles. Where utilized, the analytical model may be designed based on a particular machine type and specific design parameters thereof.

A process, which may be said to be an offline process, is then utilized for determining a reference current profile, which can be an optimal reference current profile. This offline process utilizes the obtained DC-link current, torque, and radial force ripple minimization LUTs, thereby producing the reference current profile as a function of position and its $\theta_{on}$ and $\theta_{off}$ angles, which can be optimized. Again, the DC-link current, torque, and radial force ripple minimization LUTs can also be optimized. This generated current profile can then be utilized to inject an optimum current waveform in addition to constant reference current. Once an optimal current shape is acquired from a control based-optimization method, the SRM controller can drive the waveform to phase windings through the inverter.

With further description of the offline nature, the obtained DC-link current, torque, and radial force ripple minimization LUTs are generated offline, prior to operation. Though the reference current profile may further rely on position feedback signal during operation. Said another way, while the generation of the LUTs is offline, which can include generation of a model based on experimental tests and/or simulations, and which can include generation of an optimized current waveform, the subsequent control is implemented real time based on actual measurements.

As will be further discussed below, two approaches are disclosed for developing the reference current profile: control based current profiling and current harmonic injection.

Figure 3:
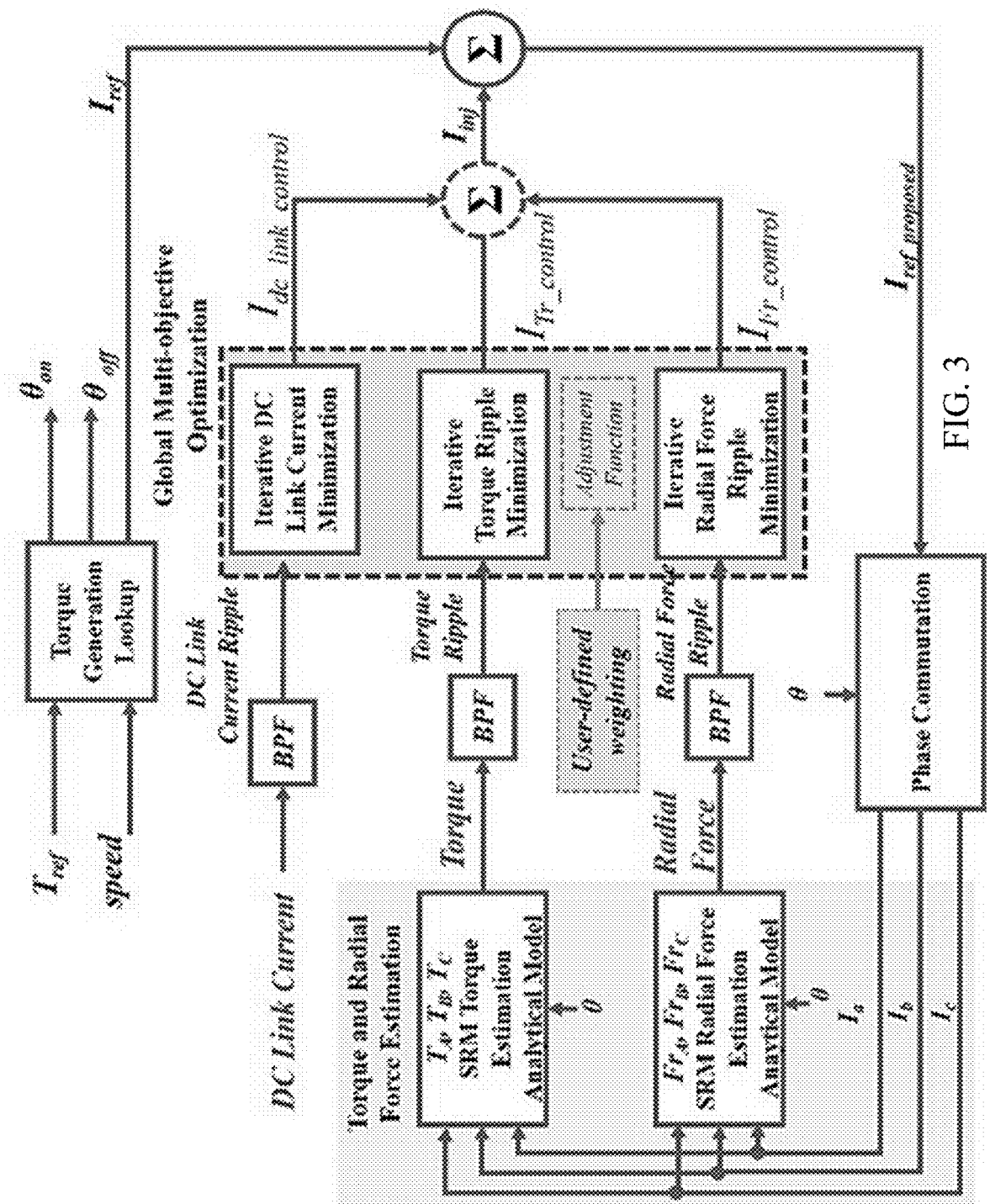
FIG. 3 is a block diagram of a current profile generation technique according to one or more embodiments of the invention.

For the control based current profiling method, a control based current profile optimization block diagram is presented in FIG. 3. As shown in FIG. 3, torque and radial force can be estimated from an analytical model that includes one or more analytical equations, and DC-link current ripple, torque ripple, and radial force ripple are filtered as an input to a global minimum optimization algorithm to find optimum current harmonic injection to the reference current. Phase torques ($T_A$, $T_B$, $T_C$) and radial forces ($F_{rA}$, $F_{rB}$, $F_{rC}$) can be generated with a SRM torque model and a radial force model, respectively, for a given phase current and position.

For the global multi-objective optimization, a Band Pass Filter (BPF) can be implemented to acquire only torque ripple, radial force ripple, and DC-link current ripple without the DC component. Like the DC-link ripple, low-frequency radial force ripple and the torque ripple contain the $N_pN_{rp}$ order, where $N_p$ is number of phases and $N_{rp}$ is number of rotor poles. Depending on the number of orders that need to be eliminated, the bandwidth of the bandpass filter for both radial force ripple and torque ripple can be determined. The frequency component of the radial force ripple and the torque ripple should be determined offline.

The global multi-objective optimization method then uses a closed-loop ripple reduction method simultaneously to generate the injected currents, which are shown as $I_{dc\_link\_control}$, $I_{Tr\_control}$, and $I_{Fr\_control}$ that combine to form $I_{inj}$. A proposed current profile $I_{ref\_proposed}$ is obtained with summation of the injected currents $I_{inj}$ and the conventional reference current $I_{ref}$.

As further description of the global multi-objective optimization, the global multi-objective optimization process can be achieved through very high bandwidth closed-loop controllers. In this optimization process, the DC-link current ripple, torque ripple, and force ripple controllers work simultaneously to achieve the ripple reduction targets. The optimization process then sends the augmented error signals to the controllers to generate the injected phase currents in minimizing the DC-link current, torque, and force ripples.

Figure 4:
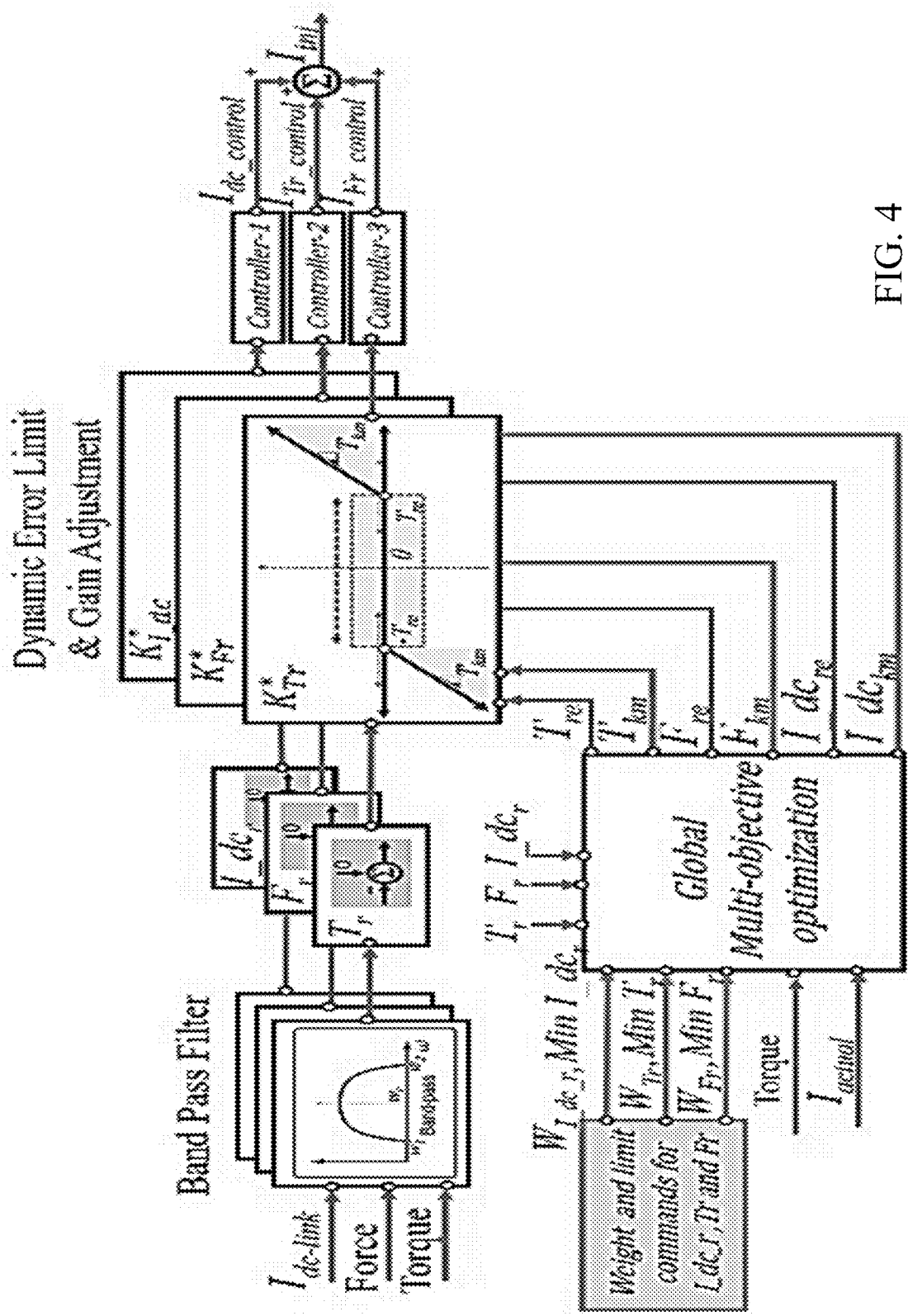
FIG. 4 is a block diagram of a user-defined, multi-objective, global optimizer according to one or more embodiments of the invention.

This is shown further in FIG. 4, which shows a block diagram for a user-defined multi-objective optimizer. In the block diagram of FIG. 4, the current fluctuation limit is adjusted by the system controller and the user defines the weighting of the torque ripple, radial force, or DC-link current ripple to feed the reference current. Iterative torque, radial force, and DC-link current ripple minimization block implement controllers can be utilized to minimize all three ripples. Iterative torque and radial force ripple minimization blocks reduce DC-link current, torque, and radial force ripples by adjusting error gain and the error forgetting limits at each iteration. Generally speaking the iteration steps can be continued until reaching a desired performance within allowable tolerances, where these allowable tolerances may be determined by a user for a certain machine. For example, with reference to FIG. 4, the allowable DC-link current ripple $Idc_{re}$, torque ripple $T_{re}$, and radial force ripple $F_{re}$ are shown, and the iteration can include iteratively adjusting the phase currents until reaching the allowable limits for these variables.

This optimization mechanism aims to reduce the ripple contents to zero as explained further here. The ripple error signal in the control loop taken as Formula (8):

$$e(\theta) = -F_r(\theta) \quad \text{If} \quad e(\theta) > F_{re}(t_i) \text{ or } \quad e(\theta) < -F_{re}(t_i)$$
$$K_{Fr}^*(t_i) = F_{km}(t_i) \text{ Otherwise, } K_{Fr}^*(t_i) = 0 \qquad \text{Formula (8)}$$

where, $t_i$ is the number of iterations for optimization. The $F_{re}$ ($t_i$) defines the level below where the error force ripple is ignored and $F_{km}$ ($t_i$) is the gain for the force ripple error. Both variables can be adjusted iteratively to implement the optimization for reducing the DC-link current, torque, and radial force ripple. The optimization algorithm checks the current level of the DC-link, torque, and radial force ripple and compares it with the weighting ratios commanded by the user. If there is a discrepancy, the optimization algorithm adjusts the $F_{re}$ and the $F_{km}$ in the next iteration cycle.

With further description of FIG. 4, constrained non-linear optimization and sweeping methods are used for the multi-objective optimization. The individual control evaluation mechanism is introduced, and it is converged to a multi-objective structure with the summation of the single objectives with their corresponding weights. The fitness function in the multi-objective DC-link, radial force, and torque ripple optimization is shown in Formula (9):

$$F_{fitness} = w_1 f_1 + w_2 f_2 + w_3 f_3 \qquad \text{Formula (9)}$$

where $w_1$, $w_2$, $w_3$ are the weights of the DC-link, torque, and radial force ripple objectives respectively, and $f_1$, $f_2$ and $f_3$ are the fitness value of the DC-link current, torque, and radial force ripple objectives respectively. A user can input the values for $w_1$, $w_2$, and $w_3$ and $f_1$, $f_2$ and $f_3$. Also, $w_1$, $w_2$, and $w_3$ and $f_1$, $f_2$ and $f_3$ can include initial values, and these initial values can be modified from these initial values during operation. Said another way, $w_1$, $w_2$, and $w_3$ and $f_1$, $f_2$ and $f_3$ can be set for a certain motor drive, and different weightings from the initial setting can be used for different operating speed and torque conditions. To achieve the target, fitness function is minimized. $K_{I\_de}^*$, $K_{Tr}^*$ and $K_{Kr}^*$ are defined and $Idc_{km}$, $Idc_{km}$, $T_{km}$, $T_{re}$, $F_{km}$, $F_{re}$ can be adjusted at every iteration to achieve the targets.

The multi-objective global optimization is subjected to the following constraints shown in Formulas (10) to (15).

| | |
|---|---|
| $T_{req\_min} \leq T_{avg} \leq T_{req\_max}$ | Formula (10) |
| $I_{ref\_min} \leq I_{actual} \leq I_{ref\_max}$ | Formula (11) |
| $\text{abs}\left(\dfrac{d\lambda}{d\theta}\right) \leq \dfrac{V_{dc}}{w_b}$ | Formula (12) |
| $Idc_{ripple} < \min Idc_{ripple}$ | Formula (13) |
| $T_{ripple} < \min T_{ripple}$ | Formula (14) |
| $F_{ripple} < \min F_{ripple}$ | Formula (15) |

These constraint sets are determined through the capabilities of the selected SRM and the power electronics inverter drive. Formula (10) sets the average torque within the required level, Formula (11) limits injected overshoot current, and Formula (12) limits the rate of change for flux linkage for a given speed ($w_b$) and DC bus voltage. Formulas (13) to (15) limit ripple selected by the user. Since this optimization process is running offline to generate an optimum current profile, the system response should be fast enough, and it may require a relatively high bandwidth controller in system modeling. The multi-objective control optimization acts to find a global minimum to obtain the best decision variables of the system controller parameters. The iteration time of the multi-objective optimizer may be higher than the settle time of the controller.

As mentioned above, one approach for developing the reference current profile is a current harmonic injection method. The current harmonic injection may be a key factor in affecting the DC-link current, torque, radial force ripple, as well as the harmonic content of the force ripple. The current harmonic injection method generally includes adding sinusoidal current series to conventional reference current to adjust torque level depending on the tangential flux density region.

The torque harmonics and the radial force harmonics are the integer number of the lowest common multiple (LCM) of the stator and rotor pole numbers, $N_s$ and $N_r$. The fundamental frequency of the radial force and torque may be referred to as pole passing frequency. In SRM, the phases are excited sequentially. The excitation frequency of each phase is related to $N_r$ and the mechanical rotational frequency $\omega_r$ given as Formula (16).

$$f_{exc} = \frac{N_r \omega_r}{60} \qquad \text{Formula (16)}$$

The frequency of the output torque and the radial force ripple are related to $f_{exc}$ and the number phases $N_p$ as shown in Formula (17):

$$f_{T\_ripple\_m} = f_{F\_ripple\_m} = m N_p f_{exc} \qquad \text{Formula (17)}$$

where m is the harmonic number for the torque or radial force ripple.

The radial force of SRM can be formulated as in Formulas (18) and (19):

$$F_{rn}(\theta, i_n) = k_{rn}(\theta, i_n) i_n^2(\theta) \qquad \text{Formula (18)}$$

$$k_{rn}(\theta, i_n) = a_{r0}(i_n) + \Sigma_{n=1}^{n_{max}} a_{rn}(i_n) \cos(nN_{rp}\theta + \varphi_{rn}) \qquad \text{Formula (19)}$$

where $k_n$ is the force factor and $i_n$ is the phase current. As seen in Formula (18), both radial force and force factor are dependent on the rotor position $\theta$ and the current $i_n$. Force factor can be written as in Formula (19) where $n_{max}$ is the maximum number of harmonic order to be considered for force factor, the coefficients $a_{r0}$, $a_{rn}$ are functions of current, and $\varphi_{rn}$ are the phase angles.

Similarly, current $i_n$ can be written as Formula (20)

$$i_n(\theta) = i_{ref} + \Sigma_{m=1}^{m_{max}} i_m \sin(mN_{rp}\theta + \varphi_{cm}) \qquad \text{Formula (20)}$$

where $i_{ref}$ is the reference current, $m_{max}$ is the maximum number of harmonic orders, and $N_{rp}$ is the number of rotor poles.

The injected currents to the conventional current waveforms to reduce the torque and radial force ripples can be formulated as Formula (21)

$$I_{inj}(\theta) = \Sigma_{m=1}^{m_{max}} A_m \sin(k_m \theta + \varphi_m) \qquad \text{Formula (21)}$$

where m is the harmonic number of the injected current, $k_m$ is $mN_pN_r$, $\theta$ is the mechanical rotor angle, $A_m$ is the amplitude of the injected current, and $\varphi_m$ is spatial phase of the $m^{th}$ injected current harmonic.

A visual representation of the harmonic current injection can be obtained for certain harmonics (e.g. the first three harmonics) in order to assist with this method. For example, individual current harmonic injection with local optimization can give the initial baseline. In one embodiment, injection of the first current harmonic significantly reduces the 1st and 2nd radial force harmonics, but it increases other harmonics, and the second harmonic injection reduces the 2nd and other radial force harmonics. There generally is not a linear relationship between current, DC-link, radial force, and torque because of the saturation and square law relating flux density generation.

As an example, a radial force analytical model with current harmonics is presented in Formula (22). Without being bound by any theory, it is generally believed that individual harmonic injection will not help to reduce ripples in the whole range as seen in Formula (22). Therefore, global optimization may be necessary to obtain optimal current profile.

$$F_{rn\_sum}(\theta, i_n) = N_{ph}a_{ro}(i_n)i_{ref}^2 +$$
$$2N_{ph}I_{ref}a_{ro}(i_n)\sum_{m=1}^{m_{max}} i_m[\sin(mN_{ph}N_{rp}\theta + \varphi_{cm})] \pm \frac{N_{ph}a_{ro}(i_n)}{2}$$
$$\sum_{m=1}^{m_{max}}\sum_{r=1}^{m_{max}} i_m i_r [\cos\{(m \mp r)N_{ph}N_{rp}\theta + \varphi_{cm} \mp \varphi_{cr}\}] +$$
$$N_{ph}i_{ref}^2 \sum_{n=1}^{n_{max}} a_{rn}(i_n)\cos(nN_{ph}N_{rp}\theta + \varphi_{rn}) \pm N_{ph}i_{ref}\sum_{n=1}^{n_{max}}$$
$$\sum_{m=1}^{m_{max}} a_{rn}(i_n)i_m[\sin\{(n \pm m)N_{ph}N_{rp}\theta + \varphi_{rn} \pm \varphi_{cm}\}] +$$
$$N_{ph}\sum_{n=1}^{n_{max}}\sum_{m=1}^{m_{max}}\sum_{r=1}^{m_{max}} \frac{a_{rn}(i_n)i_m i_r}{4}$$
$$[\cos\{(n \pm (m-r))N_{ph}N_{rp}\theta + \varphi_{rn} \pm (\varphi_{cm} - \varphi_{cr})\}] -$$
$$N_{ph}\sum_{n=1}^{n_{max}}\sum_{m=1}^{m_{max}}\sum_{r=1}^{m_{max}}$$
$$\frac{a_{rn}(i_n)i_m i_r}{4}[\cos\{(n \pm (m+r))N_{ph}N_{rp}\theta + \varphi_{rn} \pm (\varphi_{cm} + \varphi_{cr})\}]$$

Formula (22)

Figure 5:
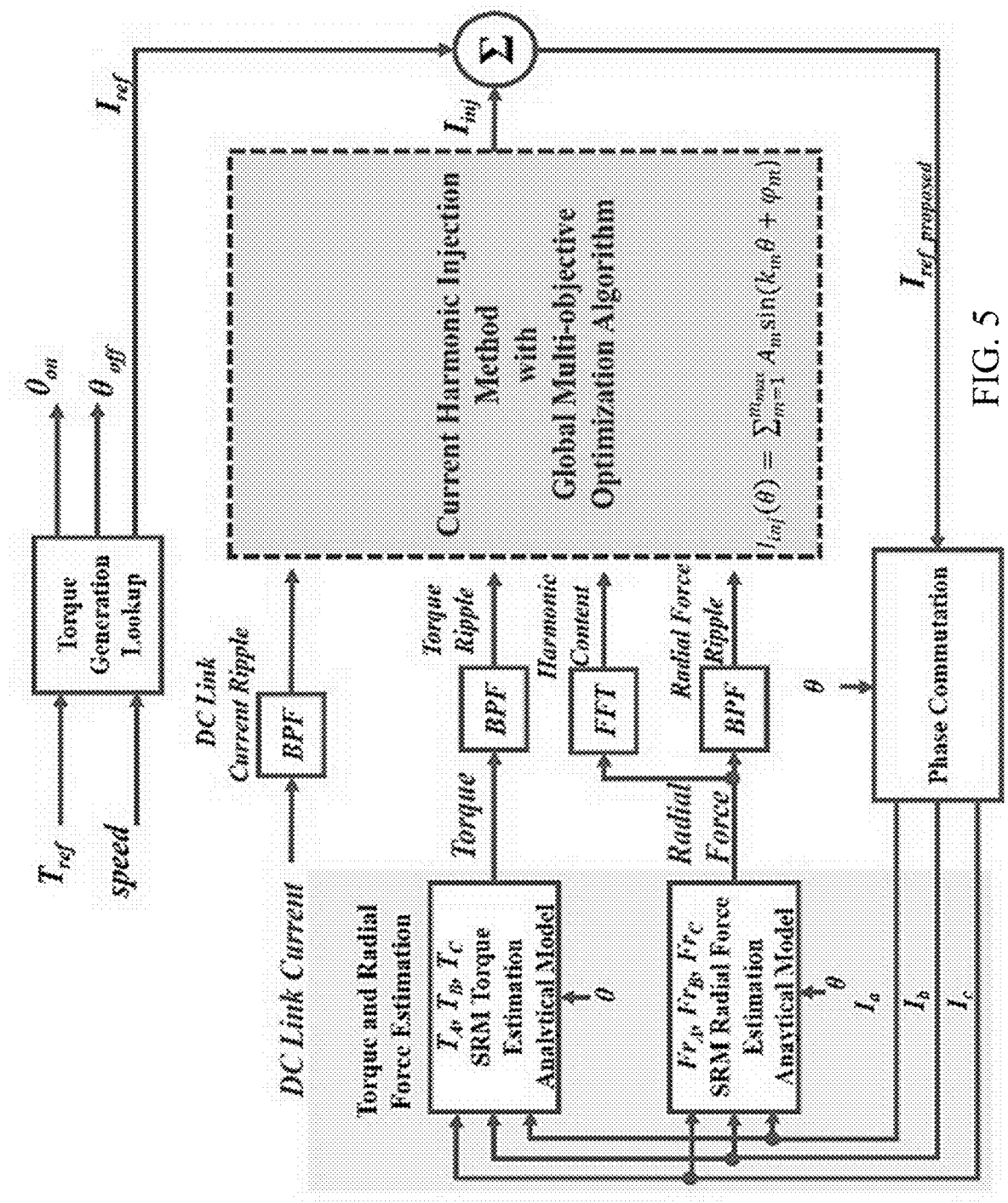
FIG. 5 is a block diagram of a current harmonic injection based current profile optimization according to one or more embodiments of the invention.

As further description of a current harmonic injection based current profile optimization technique, a block diagram is shown in FIG. 5. As shown in FIG. 5, band pass filtering (BPF) is implemented to acquire only DC-link current, torque, and radial force ripple while filtering the DC component. This band pass filtering can include filtering the high frequency noise and the DC component. An FFT block provides the harmonic contents of the radial force. DC-link current, torque, radial force ripple, and radial force harmonics at the selected natural frequencies are provided to the optimization block as shown in FIG. 5. The optimization block operates in two stages to implement the local optimizations first, and the global optimization thereafter. The output of the optimization block is magnitude and phase coefficients of the injected current harmonics $I_{inj}$. A proposed current profile $I_{ref\_proposed}$ is obtained with summation of the injected currents $I_{inj}$ and the conventional reference current $I_{ref}$.

Figure 6:
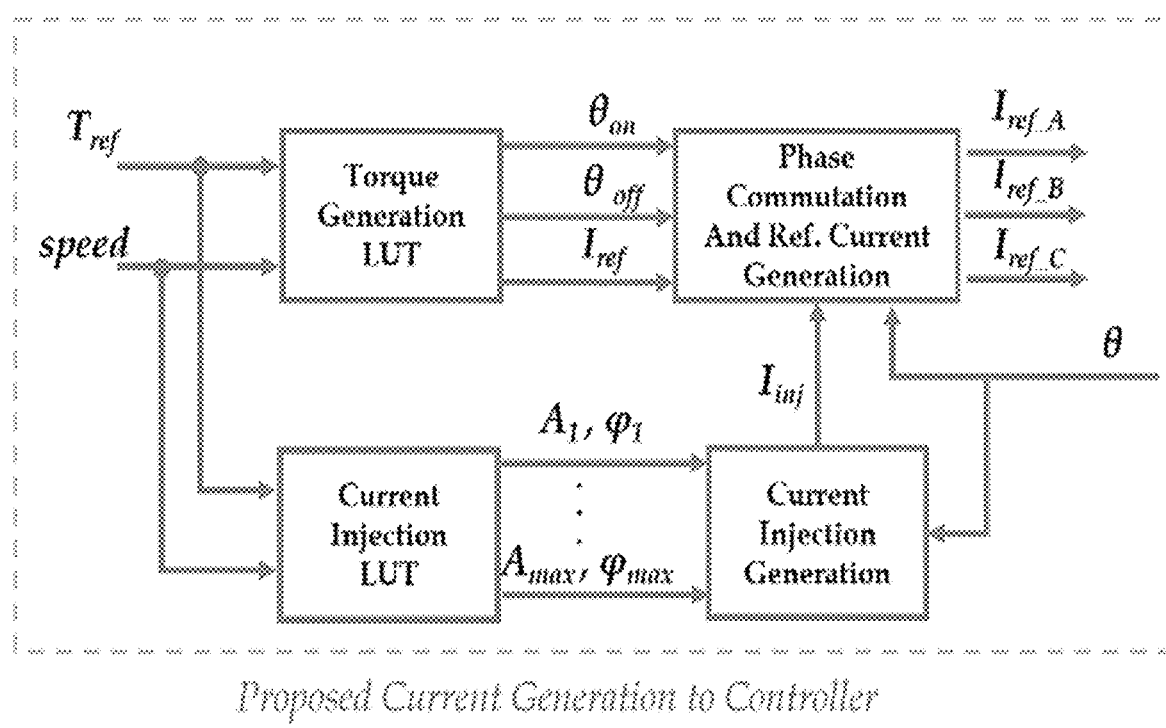
FIG. 6 is a block diagram of current generation with harmonic current injection according to one or more embodiments of the invention.

With reference to FIG. 6, FIG. 6 shows the incorporation of a harmonic current injection technique into an existing control system, according to one or more embodiments of the present invention. The harmonic currents are generated based on the optimized coefficients from the global optimization process and provided to the phase commutation block. A look up table (LUT) is generated to get the coefficients for a given speed and torque operating point.

A multi-objective constrained non-linear algorithm is used to find global minimum to obtain best decision variables of the current harmonic coefficients. The goal of the multi-objective optimization algorithm is to find the magnitude and phase of the phase current injections that minimizes the DC-link current ripple $Idc_{ripple}$, torque ripple $T_{ripple}$, radial force ripple $F_{ripple}$, and eliminates the selected frequency components of the radial force ripple simultaneously.

The multi objective global optimization objective can be defined as Formula (23)

$$\min R(C(A_m,\varphi_m)) = w_1 Idc_{ripple}(C(A_m,\varphi_m)) + w_2 T_{ripple}(C(A_m,\varphi_m)) + w_3 F_{ripple}(C(A_m,\varphi_m)) + w_4 FFT_{fi}(F_{ripple}(C(A_m,\varphi_m)))$$

Formula (23)

where $C(A_m, \varphi_m)$ is the decision variables which has current injection harmonic coefficients; $w_1$, $w_2$, $w_3$, and $w_4$ are weighting factors; and $FFT_{fi}$ is the radial force harmonic component at frequency $f_i$.

As mentioned above, one or more embodiments relate to an interleaving technique for reducing the DC-link capacitor requirement for switched reluctance motor (SRM) drives. The interleaving technique may also be referred to as an interleaved fixed switching frequency predictive current control (FSFPCC) method. The interleaving technique may include inner loop pulse-width modulation (PWM) interleaving between the phases during the overlapping period and is generally utilized for regulating the phase current. Generally, interleaved PWM control is utilized to coordinate the phases of the SRM drive system. During the current commutation between the phases, the interleaving method imposes phase shifting between the triangular carriers. The interleaving technique ensures that the dominant harmonic content of the DC-link current is concentrated around twice switching frequency ($2f_{sw}$) and significantly reduces the DC-link capacitor requirement.

Figure 7:
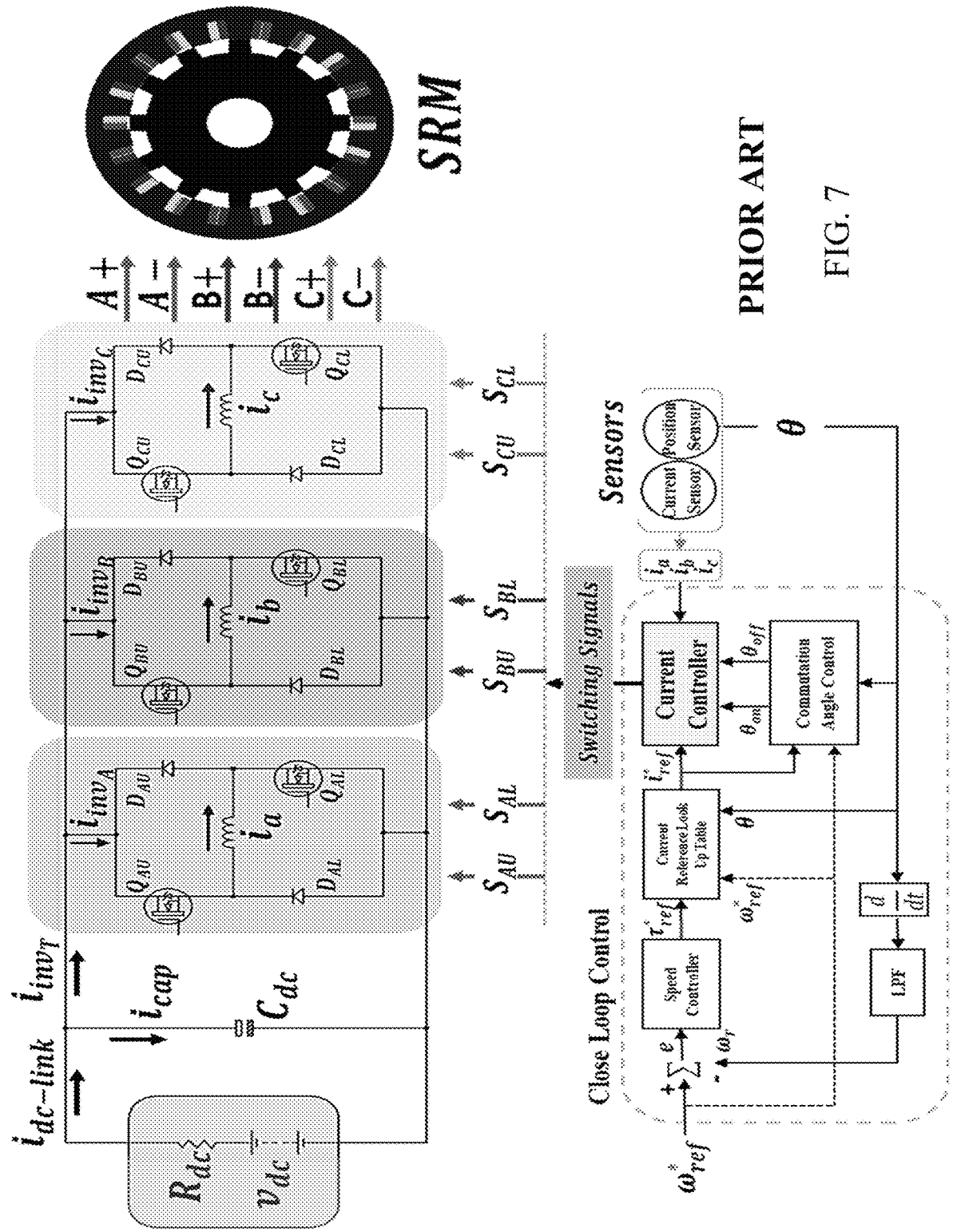
FIG. 7 is a block diagram of a conventional three-phase SRM drive system.

Certain details relative to conventional SRM drive systems are now explained. With reference to FIG. 7, FIG. 7 shows block diagram of a conventional three-phase SRM drive system. The SRM drive system includes an asymmetric H-Bridge inverter, a battery, DC-link capacitors ($C_{dc}$), current sensors, position sensor, gate driver and control block. The overall closed loop control includes an outer speed control loop and inner current control loop. The speed controller uses a proportional-integral (PI) controller to set the level of required torque $\tau_{ref}^*$ to maintain the desired speed level. Then, a lookup table (LUT) generates a required amount of phase current reference, $i_{ref}^*$ for the desired torque and speed requirement. The current controller takes the $i_{ref}^*$ and measured phase currents ($i_a$, $i_b$, $i_c$) and turn on and off angles ($\theta_{on}$ and $\theta_{off}$) as inputs and generates switching signals ($S_{AU}$, $S_{AL}$, $S_{BU}$, $S_{BL}$, $S_{CU}$, $S_{CL}$) for upper and lower switches of all phases.

Certain details relative to the origin of high DC-link current ripple for a conventional current control method of SRM are now explained. Considering all the fundamental voltage and current relations in the DC-link side, the total inverter current $i_{invT}$ and DC-link current $i_{DC-link}$ can be related by the differential equation given in Formula (101) where $R_{dc}$ is the internal source resistance. Then the frequency domain relationship between these two currents can be derived as shown in Formula (102).

$$i_{dc-link}(t) + R_{dc}C_{dc}\frac{di_{dc-link}(t)}{dt} = i_{invT}(t)$$

Formula (101)

-continued $$h_b(s) = \frac{I_{dc-link}(s)}{I_{inv_T}(s)} = \frac{1}{1+sR_{dc}C_{dc}} \quad \text{Formula (102)}$$

This relationship reveals that, for any harmonic content $A_n \cos(nN_pN_{rp}\theta)$ present in the inverter current, harmonic content in the DC-link current will be $|h_b(n, A_n)|\cos(nN_pN_{rp}\theta + \angle h_b(nmA_n))$. Here $A_n$ is the magnitude of $n^{th}$ order harmonic content of the inverter current, and $N_p$ and $N_{rp}$ are the number of phases and number of rotor poles respectively. The expression for the magnitude $|h_b(n, A_n)|$ and phase $\angle h_b(n, A_n)$ of the transfer function $h_b(s)$ can be expressed as shown in Formula (103) and Formula (104) where $\omega$ is the angular speed of the machine.

$$|h_b(n, A_n)| = \frac{A_n}{\sqrt{1+n^2N_p^2N_{rp}^2\omega^2R_{dc}^2C_{dc}^2}} \quad \text{Formula (103)}$$

$$\angle h_b(n, A_n) = \tan^{-1}(n\omega N_p N_{rp} R_{dc} C_{dc}) \quad \text{Formula (104)}$$

At switching frequency, n is a large number ($n_{sw}$ is large) i.e. $n_{sw}^2 N_p^2 N_{rp}^2 \omega^2 R_{dc}^2 C_{dc}^2 \gg 1$, and the reflected harmonic content in the DC-link current $|h_b(n_{sw}, A_{n_{sw}})|$ becomes negligible for higher switching frequency, as illustrated in the approximation made in Formula (105). Otherwise for low speed ($\omega$ is low) and lower order harmonic number ($n_{LF}$ is small), $n_{LF}^2 N_p^2 N_{rp}^2 \omega^2 R_{dc}^2 C_{dc}^2 \ll 1$ and that harmonic content will be reflected in the DC-link current from the inverter current without any significant attenuation as shown in Formula (106).

$$|h_b(n_{sw}, A_{n_{sw}})| \approx \frac{A_{n_{sw}}}{n_{sw} N_p N_{rp} \omega R_{dc} C_{dc}} \approx 0 \quad \text{Formula (105)}$$

$$|h_b(n_{LF}, A_{n_{LF}})| \approx A_{n_{LF}} \quad \text{Formula (106)}$$

For the SRM drive, during the current commutation between the phases, low-frequency harmonics are being injected in the DC-link current. Although the DC-link capacitor $C_{dc}$ provides significant attenuation for the switching frequency content, the low frequency content presented in the total inverter current $i_{inv_T}$ is reflected on the DC-link current $i_{dc-link}$. As a result, a conventional hysteresis current controller based SRM drive system generally requires a bulky capacitor bank for overall ripple content suppression.

As mentioned above, the interleaving technique may also be referred to as an interleaved fixed switching frequency predictive current control (FSFPCC) method. Aspects of a conventional FSFPCC method may be disclosed in the reference article "A Fixed Switching Frequency Predictive Current Control Method for Switched Reluctance Machines" from R. Mikail et al. (IEEE Trans. Ind. Appl., vol. 50, no. 6, pp. 3717-3726, Nov.-Dec. 2014), which is incorporated herein by reference, for understanding of the presently disclosed interleaved FSFPCC method. In one or more embodiments of the present invention, a FSFPCC method is adopted for a duty ratio generation scheme.

As further description of an interleaved FSFPCC method, a predictive current control method uses the measured phase current ($i_{ph}(k)$), phase current reference ($i_{ph}^*(k+1)$) for the next switching cycle, and measured position ($\theta(k)$) and estimated position ($\theta_{est}(k+1)$) for the next switching cycle for predicting the next switching cycle's duty ratio ($d_U^*(k+1)$ and $d_L^*(k+1)$) for the upper switch. This is further shown in Formulas (107) to (110).

$$V_{ph} = i_{ph}R_{ph} + \frac{d\lambda(i_{ph}, \theta)}{dt} = i_{ph}R_{ph} + \frac{\partial\lambda}{\partial i}\frac{di_{ph}}{dt} + \frac{\partial\lambda}{\partial\theta}\frac{d\theta}{dt} \quad \text{Formula (107)}$$

Formula (108)

$$V_{ph}(k+1) = i_{ph}(k+1)R_{ph} +$$

$$\frac{\lambda\{i_{ph}^*(k+1), \theta_{est}(k+1)\} - \lambda\{i_{ph}(k), \theta_{est}(k+1)\}}{T_{sw}} + \frac{\lambda\{i_{ph}^*(k+1), \theta_{est}(k+1)\} - \lambda\{i_{ph}^*(k+1), \theta(k)\}}{T_{sw}}$$

$$d_L^*(k+1) = \begin{cases} 1; & \theta_{on} \leq \theta \leq \theta_{off} \\ 0; & \text{Otherwise} \end{cases} \quad \text{Formula (109)}$$

$$d_U^*(k+1) = \frac{V_{ph}(k+1)}{V_{dc}} \quad \text{Formula (110)}$$

Figure 8:
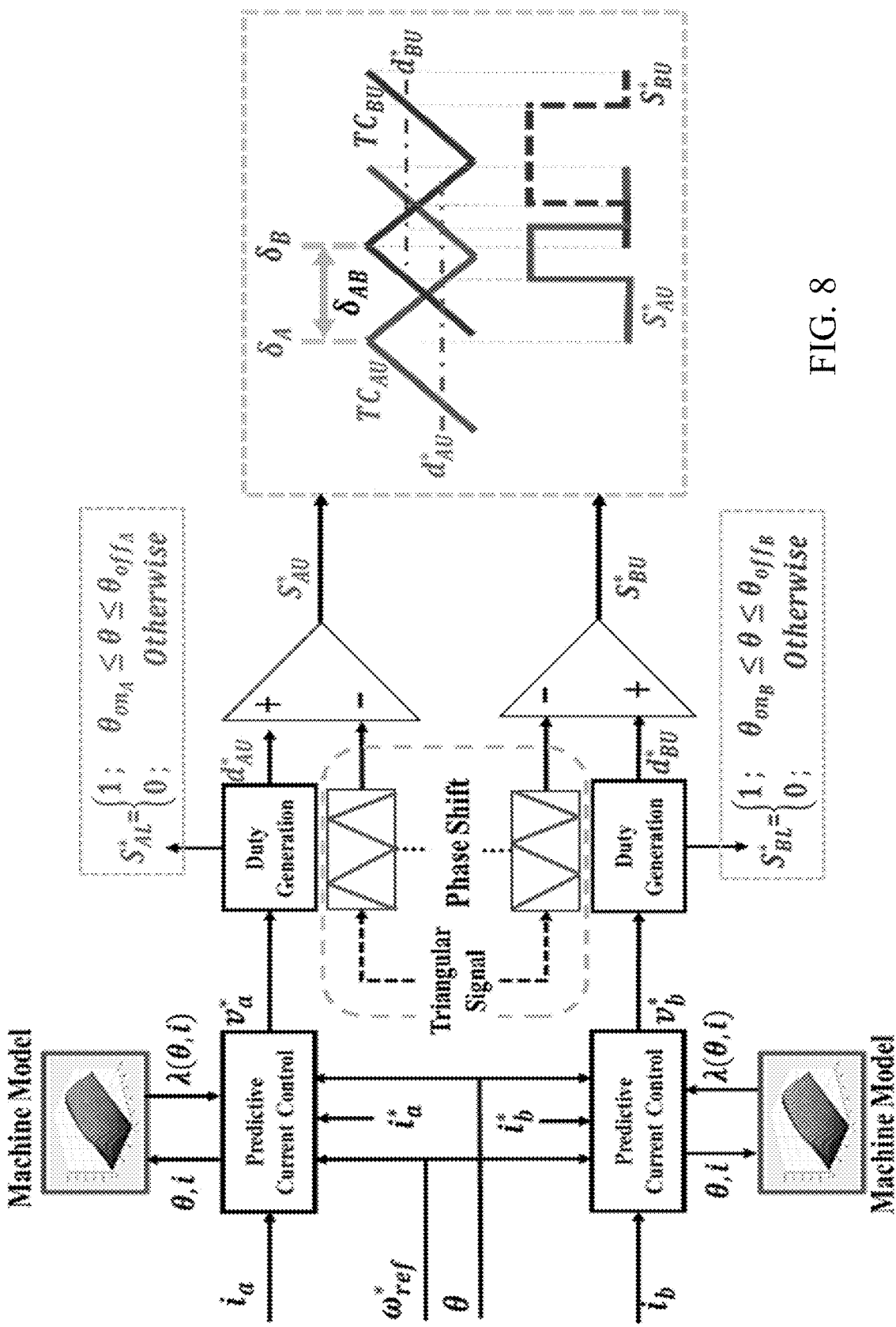
FIG. 8 is a block diagram of a phase collaborative interleaving method for an SRM drive, where collaborative control is shown for phase A and phase B, according to one or more embodiments of the invention.
Figure 9:
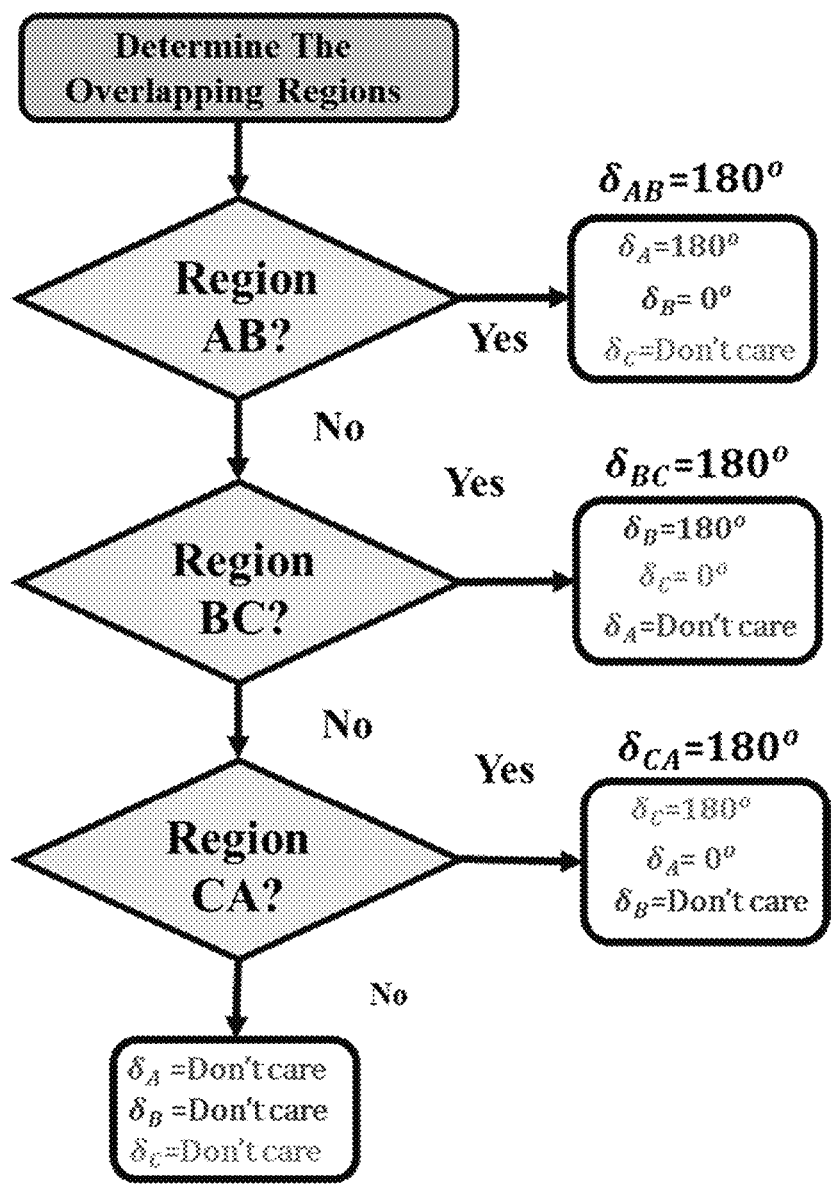
FIG. 9 is a block diagram of a method for determining interleaving angles for according to one or more embodiments of the invention.

With reference to FIG. 8, FIG. 8 shows a phase collaborative interleaving method for phase A and phase B. As shown in FIG. 8, during the overlapping region AB, the phase shift ($\delta_{AB}$) between the carrier signals of the upper switches in Phase A and B is kept at 180° to implement the interleaving strategy. A similar approach will work when collaboration of phase B and C and collaboration of phase C and A are needed. The duty ratio from the predictive current controller block is compared with a triangular carrier signal to generate a switching pattern for the upper switch. The duty ratio for the lower switch is either 0 or 1 depending on the measured position. The amount of phase shifting depends on the operating regions as shown in FIG. 9. The phase current waveforms may be obtained as evidence of synchronization of the phase currents during the overlapping region. Indeed, during the overlapping region the phase currents are nicely synchronized and 180° phase shifted at the switching level. The advantages of these phase currents during the overlapping region for an interleaved FSFPCC method are particularly evident when compared to conventional HCC and FSFPCC methods.

In one or more embodiments, the interleaving approach disclosed herein ensures no overlap between the two individual inverter currents ($i_{inv_A}$, $i_{inv_B}$) when both inverter currents are positive. This therefore creates a frequency doubling effect for the total inverter current $i_{inv_T}$. On the other hand, when one of the inverter current $i_{inv_A}$ is negative and the other one $i_{inv_B}$ is positive, the interleaving approach disclosed herein ensures complete alignment and thus enables instantaneous partial energy circulation between the phases. Complete energy circulation between the phases happens if the instantaneous average of some of the positive pulse currents are same as the instantaneous average of the negative current pulses at the same switching cycles. Again, this advantage is particularly evident when compared to conventional HCC and FSFPCC methods. Moreover, the interleaving approach disclosed herein does not create additional high amplitude current pulses compared to conventional HCC and FSFPCC methods and also helps in reducing the DC-link current ripple.

As another advantage, the interleaving approach disclosed herein reduces the low frequency content (in a similar manner as conventional FSFPCC), but the dominant harmonic content of the inverter current is concentrated around twice switching frequency ($2f_{sw}$). As capacitive impedance is lower for higher frequency, a similar amount of capacitor ability allows for higher attenuation for the interleaving approach disclosed herein.

As mentioned above, one or more embodiments relate to mode shape selection for the radial force in order to achieve a more focused radial force control. This technique may also be referred to as dominant spatial order based and airgap force based current profiling for noise, vibration, and harshness (NVH) mitigation. It should be appreciated that one or more embodiments of the present invention include independently utilizing the mode shape selection for the radial force for improving the radial force control component. In other embodiments, the mode shape selection mode shape selection for the radial force for improving the radial force control component can be incorporated within one or more other aspects disclosed herein. For example, the disclosure provided herein below relative to mode shape selection for the radial force and the disclosure provided in FIG. 10 can be incorporated within the radial force control component of FIG. 3 or within the radial force control component of FIG. 5.

Figure 10:
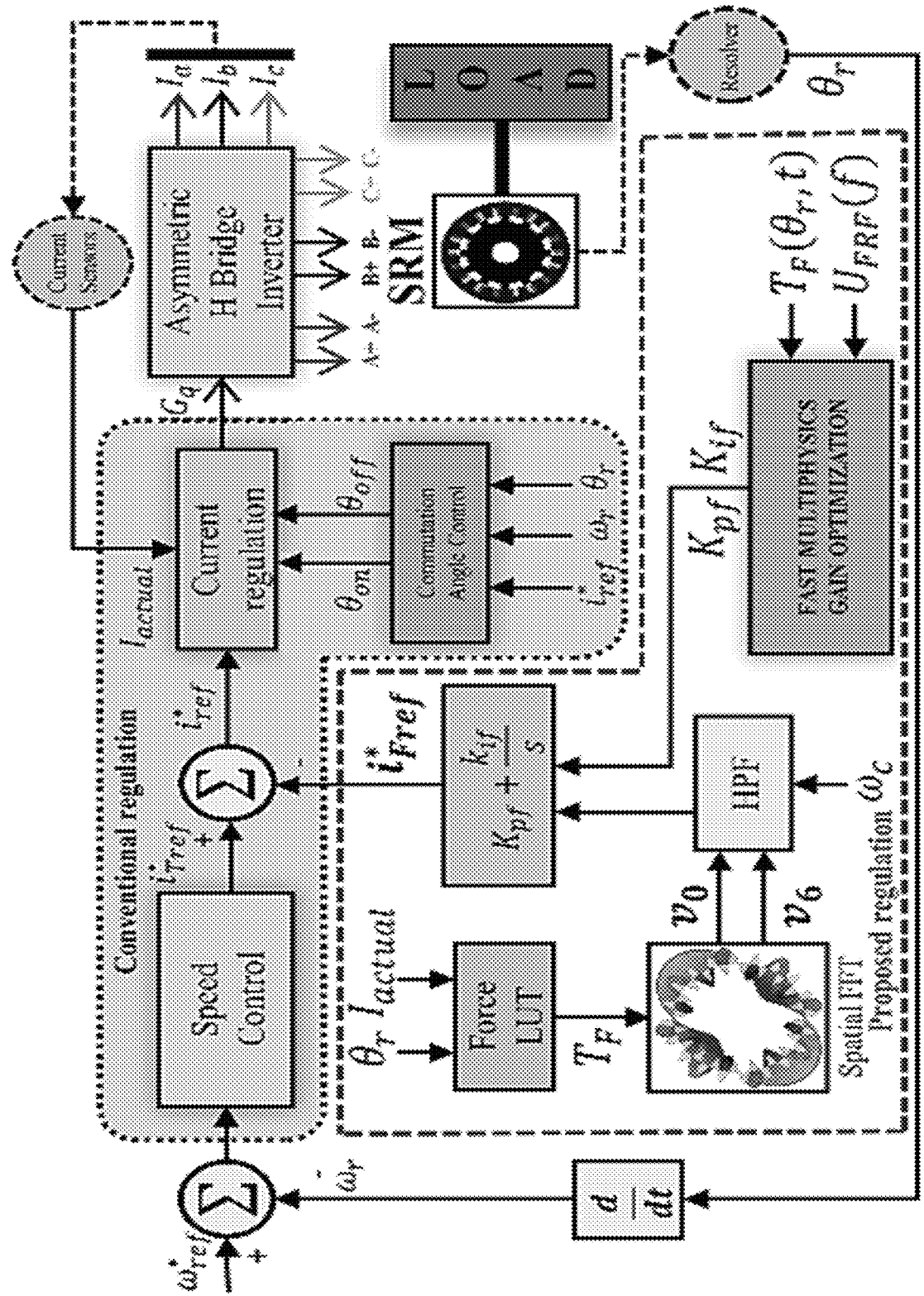
FIG. 10 is a block diagram of a method for mode shape selection for radial force control according to one or more embodiments of the invention.

With reference to FIG. 10, spatial and temporal distribution of airgap forces are calculated from inputs of $\theta_r$ and $I_{actual}$. This calculation of $T_F$ can be by dynamic simulations through a look up table-based approach. The $T_F$ is then input to a next step where 1D (spatial)-FFT is performed to identify the dominant spatial order of the airgap force.

From the 1D (spatial)-FFT, temporal orders associated with dominant spatial orders are fed through a proportional integral (PI) controller, where high pass filtering (HPF) is performed. The temporal orders can include Mode 0 and Mode 6. The HPF controller can include a further input of corner frequency $\omega_c$. The output of the HPF controller is fed into the reference current generation.

Also fed into the reference current generation is the output from a multi-physics vibration synthesis approach. This multi-physics vibration synthesis approach includes optimizing the gains of the PI controller. The multi-physics gain optimization receives inputs of $T_F(\theta_r, t)$ and $U_{FRF}(f)$ and sends outputs of $K_{pf}$ and $K_{if}$. During the gain optimization, torque per ampere and acceleration can be observed.

The overall output $i_{Fref}^*$ is then provided for summation with $i_{Tref}^*$ from the speed control of a conventional regulation system. A major advantage of this technique is that since the total radial force ripple is not being fed to the controller, the peak phase current due to profiling can be comparatively lower.

Though aspects disclosed above may specifically relate to switched reluctance motors, one or more embodiments of the present invention may also include utilization with other electric motors and machines. Other suitable electric motors may include as synchronous machines, synchronous reluctance machines, or permanent magnet machines. Aspects of these other suitable electric motors will be generally known to the skilled person.

The electric motors utilized in one or more embodiments of the present invention may be designed based on particular characteristics thereof. These design factors may include phases, rating, number of stators, number of rotor poles, torque, torque per ampere, and speed.

Figure 11:
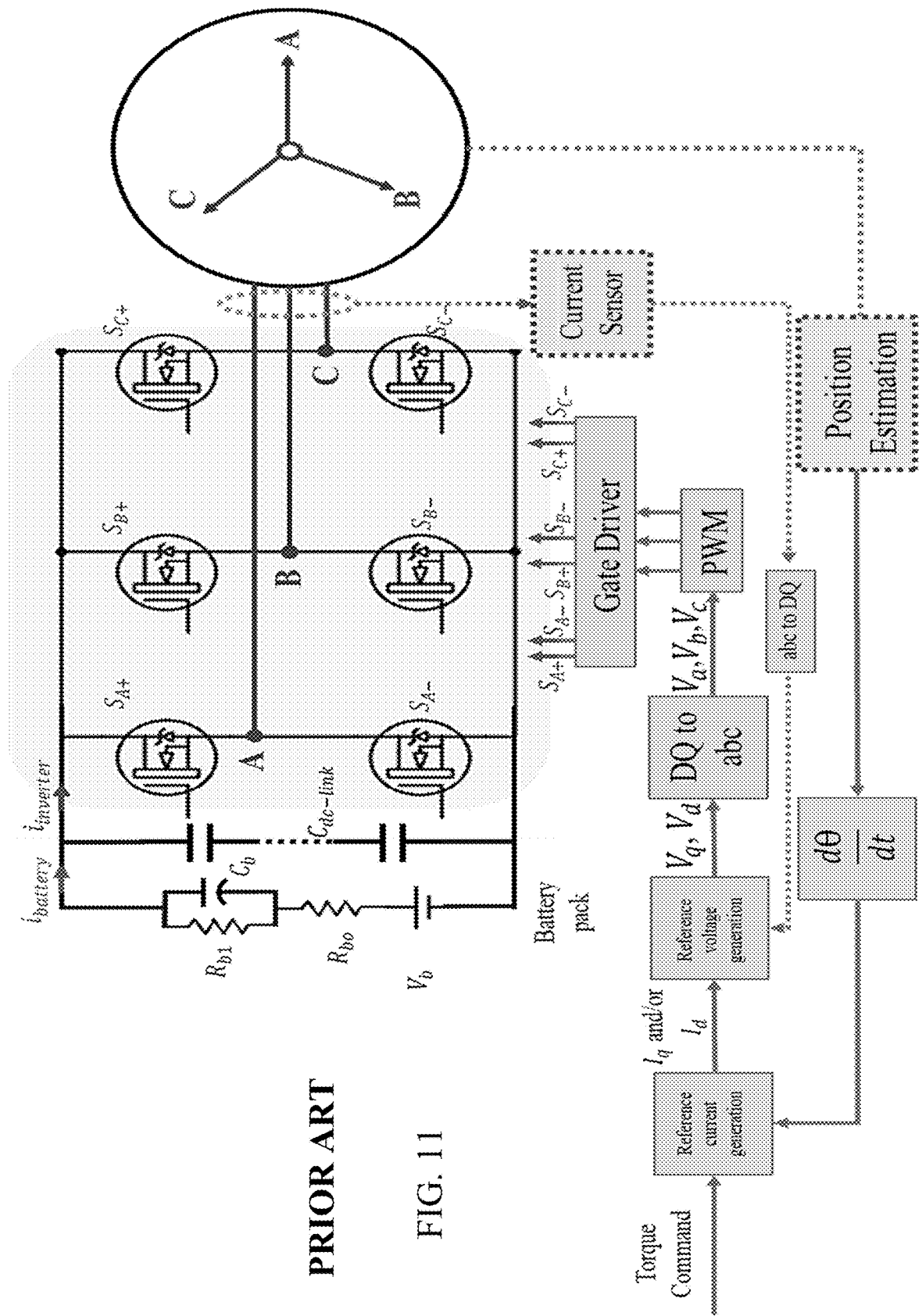
FIG. 11 is a block diagram of a conventional drive system.
Figure 12:
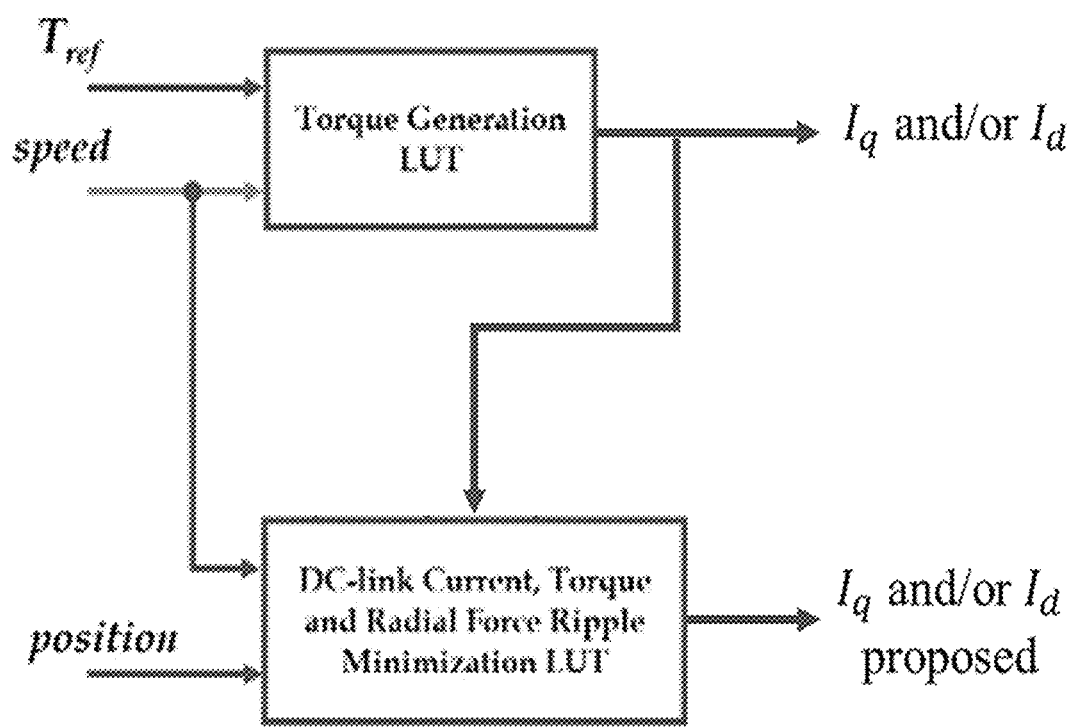
FIG. 12 is a block diagram of a current profile generation technique according to one or more embodiments of the invention.

Aspects relative to embodiments of the present invention being suitable with other electric motors are shown in FIGS. 11-15. FIG. 11 shows a block diagram of a conventional drive system for an electric motor.

Figure 13:
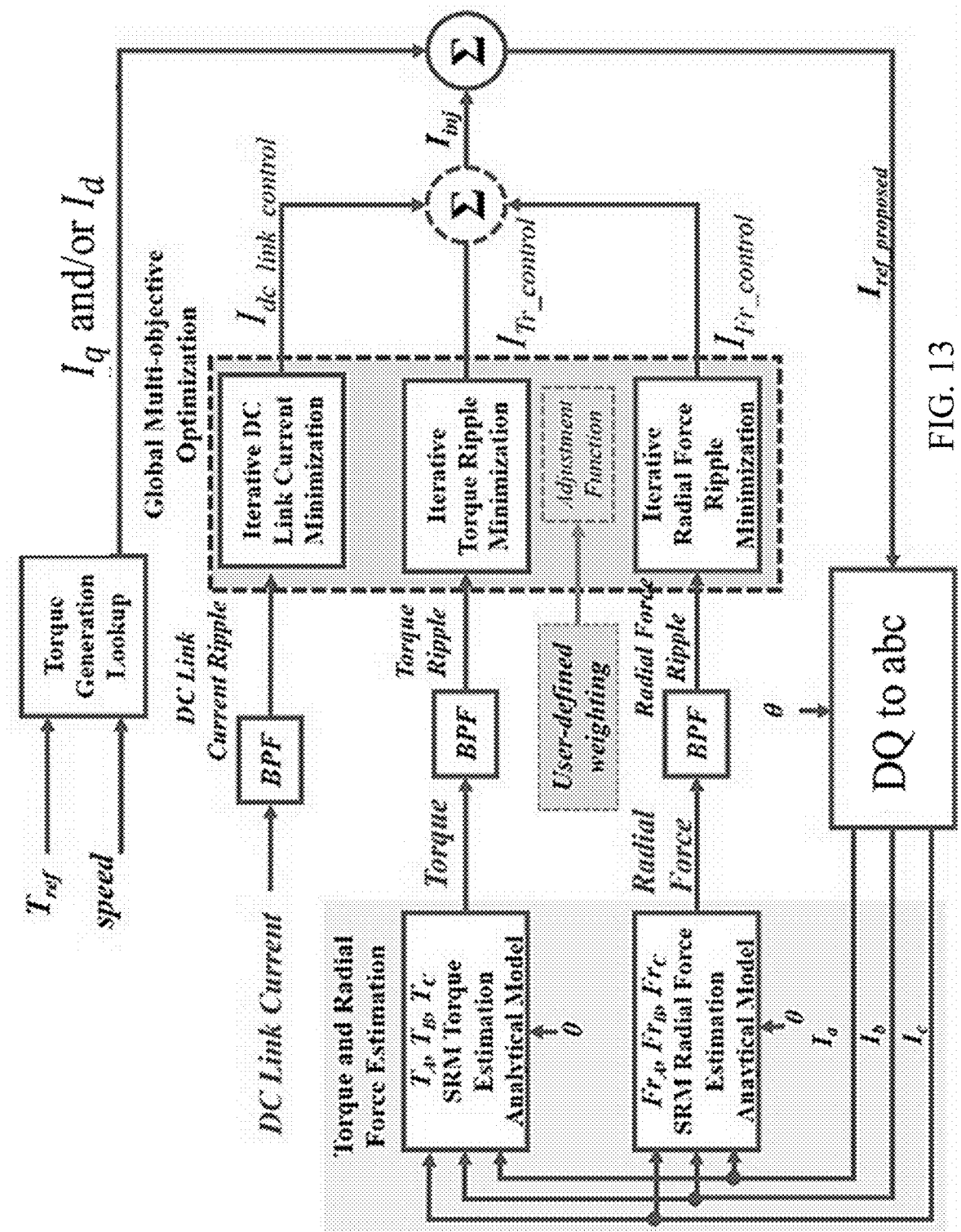
FIG. 13 is a block diagram of a current profile generation technique according to one or more embodiments of the invention.
Figure 14:
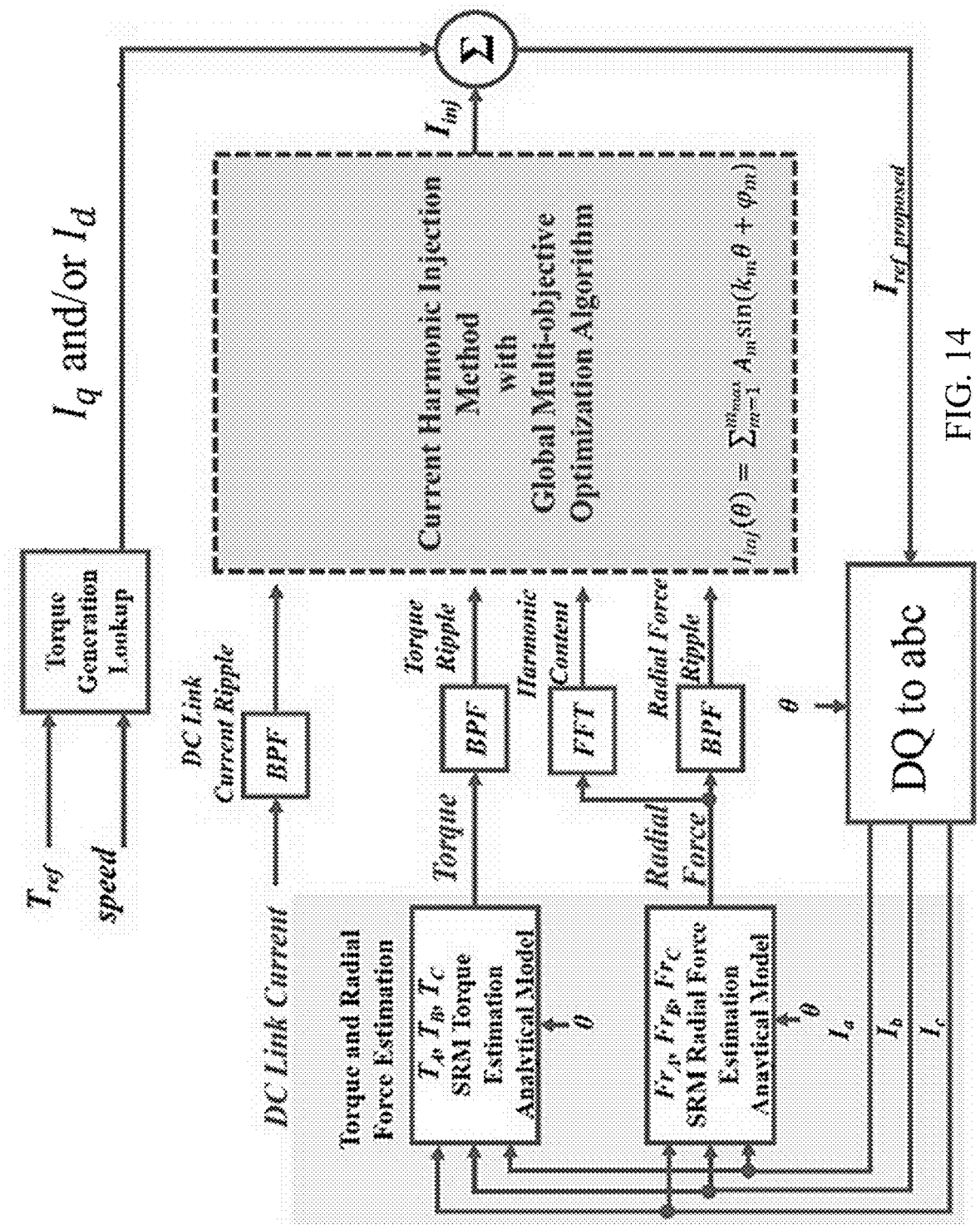
FIG. 14 is a block diagram of a current harmonic injection based current profile optimization according to one or more embodiments of the invention.
Figure 15:
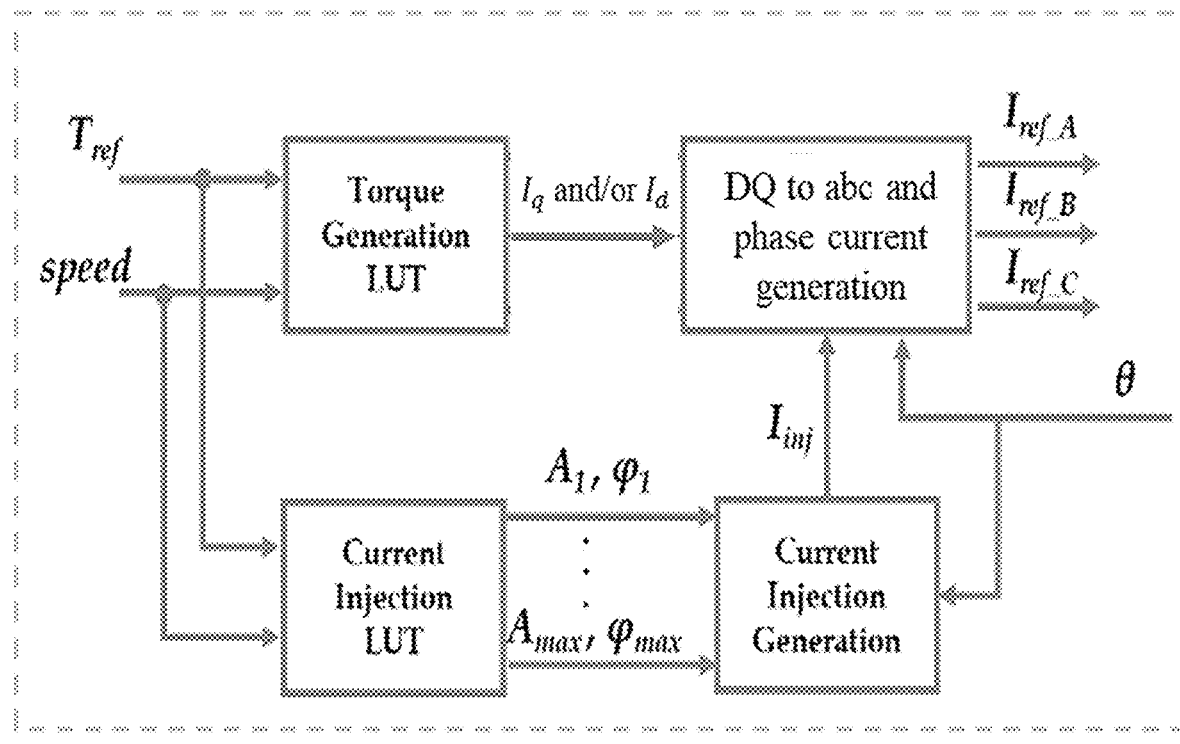
FIG. 15 is a block diagram of current generation with harmonic current injection according to one or more embodiments of the invention.

Relative to FIGS. 12-15, these Figs. generally correspond with certain disclosure above relative to switched reluctance motors, except that these Figs. are adapted for other suitable electric motors, and therefore the relevant disclosure above is also incorporated here to the extent applicable. More specifically, FIG. 12 generally corresponds with the disclosure relative to FIG. 2, and the above disclosure relative to FIG. 2 is also incorporated for FIG. 12 to the extent applicable. FIG. 13 generally corresponds with the disclosure relative to FIG. 3, and the above disclosure relative to FIG. 3 is also incorporated for FIG. 13 to the extent applicable. FIG. 14 generally corresponds with the disclosure relative to FIG. 5, and the above disclosure relative to FIG. 5 is also incorporated for FIG. 14 to the extent applicable. FIG. 15 generally corresponds with the disclosure relative to FIG. 6, and the above disclosure relative to FIG. 6 is also incorporated for FIG. 15 to the extent applicable. Relative to other suitable electric motors, FIGS. 12-15 show quadrature current $I_q$, direct current $I_d$, and a DQ to abc transformation box.

It should be appreciated that where methods are described herein, these methods are enacted by one or more physical components, such as a controller. It should be appreciated that any of the herein described components are in suitable communication with one another, which may be any suitable physical communication or wireless communication, where appropriate. That is, a controller described herein will be in suitable communication with the electric motor it is controlling. Other details relative to the one or more physical components and the suitable communication will be generally known to the skilled person.

In one or more embodiments, a method or controller of the present invention does not require extra hardware for implementation with a conventional system. In one or more embodiments, a method or controller of the present invention does not require any current shaping for implementation with a conventional system.

EXAMPLES

Example 1

Current Profile Optimization

Example 1 was performed for a technique for simultaneous DC-link current ripple, torque ripple, and radial force ripple reduction and force harmonic elimination. Finite element analysis (FEA) was performed to show the effectiveness of one or more embodiments of the present invention. Experimental test results also included comparison to a conventional control technique. Simulations and experimental tests show that one or more embodiments of the invention reduced the torque ripple, DC-link current ripple, and acoustic noise while maintaining the torque/ampere ratio.

Figure 16A:
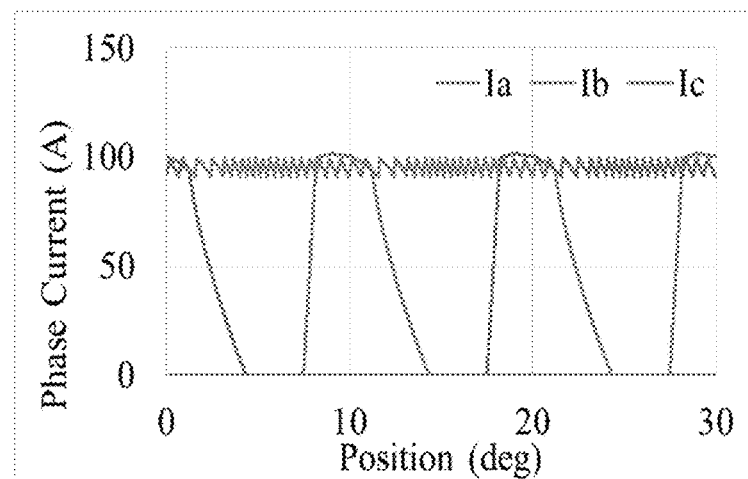
FIG. 16A is a graph showing a simulated waveform of phase currents for a conventional current method.
Figure 16B:
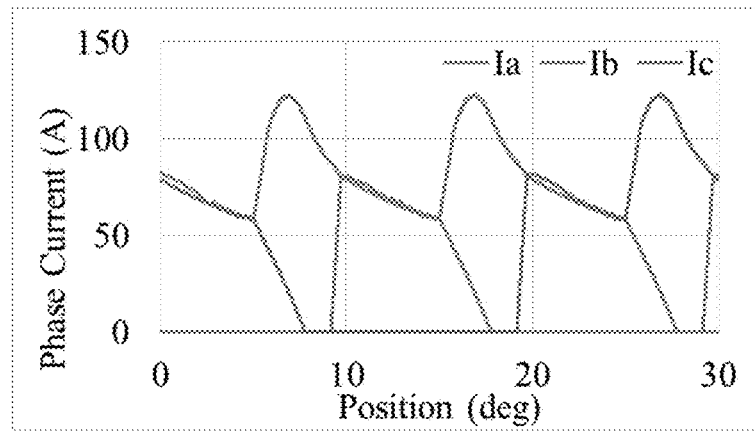
FIG. 16B is a graph showing a simulated waveform of phase currents for a current method according to one or more embodiments of the present invention.
Figure 16C:
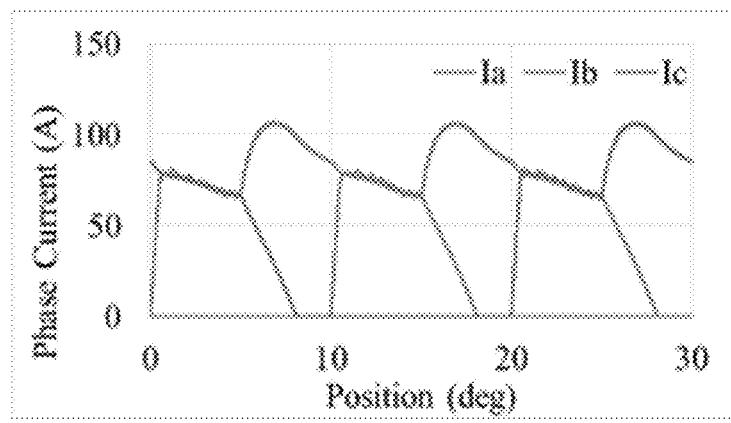
FIG. 16C is a graph showing a simulated waveform of phase currents for a current method according to one or more embodiments of the present invention.

Results for the control based current profile method are presented here. FIG. 16A is a graph showing a simulated waveform of phase currents for a conventional current method. FIG. 16B is a graph showing a simulated waveform of phase currents for a current method according to one or more embodiments of the present invention, for an Optimized Current Control (OCC) method. FIG. 16C is a graph showing a simulated waveform of phase currents for a current method according to one or more embodiments of the present invention, for a Weighted Optimized Current Control (W-OCC) method, which has different weighting function for the user-selected application case, where DC-link and radial force ripples are weighted higher than torque ripple since force ripple has more impact on the NVH performance. For a given load torque of 40 Nm at 1200 rpm, the conventional controlled current profile has a constant current of 95 A level, and the proposed current shapes have fluctuations up to 121 A as shown in FIGS. 16A-C.

Figure 17:
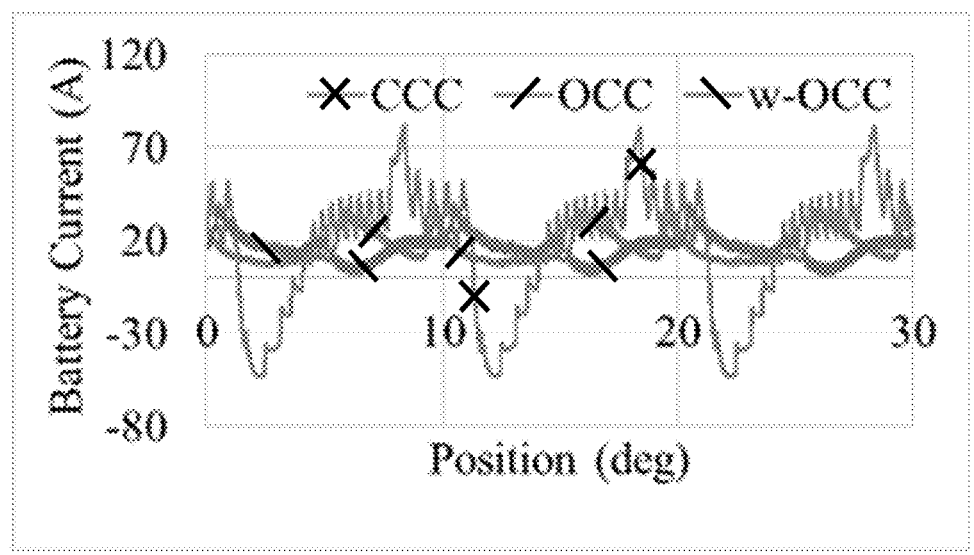
FIG. 17 is a graph showing a DC-link current ripple comparison.
Figure 18:
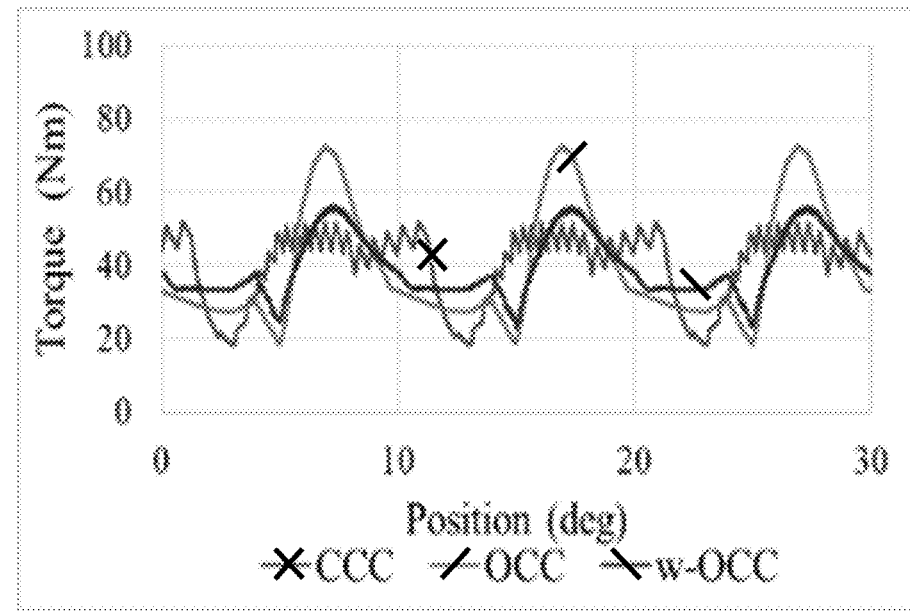
FIG. 18 is a graph showing a torque ripple comparison.
Figure 19:
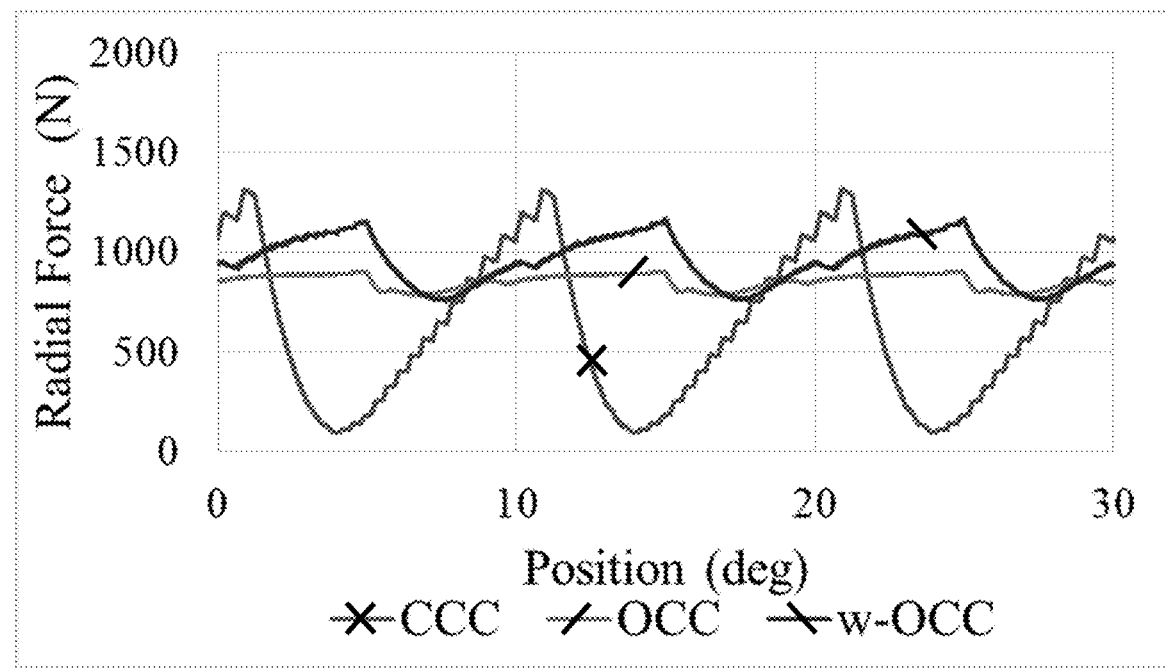
FIG. 19 is a graph showing a radial force ripple comparison.

The simulated DC-link current ripple comparison is shown in FIG. 17. FIGS. 18 and 19 present the torque and radial force ripple comparisons. The torque ripple was found to be 88% with the conventional current waveform, 154% for compromised weighted control, and 34% with the user-defined weighted control. DC-link and radial force controller increased the torque ripple; therefore the user can set the torque ripple requirements close to the conventional case while reducing DC-link and force ripple. The peak to peak ripple of the radial force for conventional current was 1227 N. The proposed current shape reduces the peak to peak radial force ripple dramatically to 124 N with optimized current control (OCC) and 410 N with weighted optimized current control (W-OCC). Battery ripple current was also reduced to 34 A from 144 A. Considering the torque per RMS current of the control methods, the OCC and W-OCC currents give more torque per RMS current compared to conventional as seen in Table 1. W-OCC current has the least RMS current of 58.83 $A_{rms}$ to generate 40 Nm of torque while the OCC and the CCC currents are 59.23 $A_{rms}$ and 65.68 $A_{rms}$ respectively.

TABLE 1

TORQUE PER AMPERE

| Current Control Method | Torque/Irms (Nm/A) |
|---|---|
| CCC | 0.615 |
| OCC | 0.675 |
| W-OCC | 0.688 |

Multi-physics simulation was performed for an operating point of 40 Nm at 1200 rpm to evaluate the vibration and acoustic noise of the conventional current shape and proposed weighted optimal current shape for the control based current profile. The proposed current profiles obtained from the optimum multi-objective control algorithm was applied to 3D Electromagnetic FEA, and the harmonic forces were calculated on stator teeth. The harmonic forces from electromagnetic analysis was imported to harmonic response analysis. In the harmonic response analysis, radial deformation, acceleration, and surface velocity were calculated on the outer surface of housing in the frequency domain. The maximum deformation of the frame surface at around 2900 Hz was 0.05 μm for the conventional current profile and 0.037 μm for the W-OCC current profile.

The acceleration levels were obtained from mechanical analysis. The maximum radial acceleration of the frame surface at 2900 Hz was 1.4 m/s² for the conventional current profile and 0.85 m/s² for the W-OCC current profile.

A test bench had a prototype SRM, 1000 V battery simulator, Horiba Dyno systems, and SRM inverter. The control method was implemented using the TI-LAUNCHXL-F28379D DSP controller. The vibration and noise data were recorded using an accelerometer and microphone during the test for post-processing data. Phase and DC-link current shapes were recorded. The proposed control based current profile had a weighted current profile that aimed to reduce radial force ripple more than others. The proposed current shaping indicated a significant reduction in battery current ripple from 200 A to 68 A while maintaining the same 40 Nm average torque at 1200 rpm.

A summary of experimental results is shown in Table 2. The wave shapes of radial acceleration and SPL were obtained at 1200 rpm, 40 Nm. Testing was done at the same torque level. At the 1200 rpm, 40 Nm point, the DC-link ripple current was reduced by 66%, radial acceleration was reduced by 54%, and acoustic noise was reduced by 8.37 dBA. In a higher torque case, i.e. at 1200 rpm, 100 Nm point, the DC link ripple current was reduced by 44%, radial acceleration was reduced by 48%, and acoustic noise was reduced by 8.34 dBA. The wave shapes of radial acceleration and SPL at 1200 rpm, 100 Nm were obtained. There was a slight difference between simulation and test results since the current profile generation was deteriorated because of sensor and position errors. From the experimental result, the proposed current shaping method improved the performance in both low and high-torque level cases for reducing DC-link ripple current, radial acceleration, and SPL.

TABLE 2

Summary of Test Results

| | 1200 rpm, 40 Nm | | 1200 rpm, 100 Nm | |
|---|---|---|---|---|
| Quantity | CCC | W-OCC | CCC | W-OCC |
| Battery Cur Rip. (A) | 200 | 68 | 252 | 140 |
| Torque/Irms (Nm/A) | 0.615 | 0.79 | 1.07 | 1.13 |
| Acceleration (m/s²) | 1.49 | 0.68 | 3.1 | 1.6 |
| SPL (dBA) | 73.71 | 65.34 | 75.36 | 67.02 |

Example 2

Phase Collaborative Interleaving

Figure 20A:
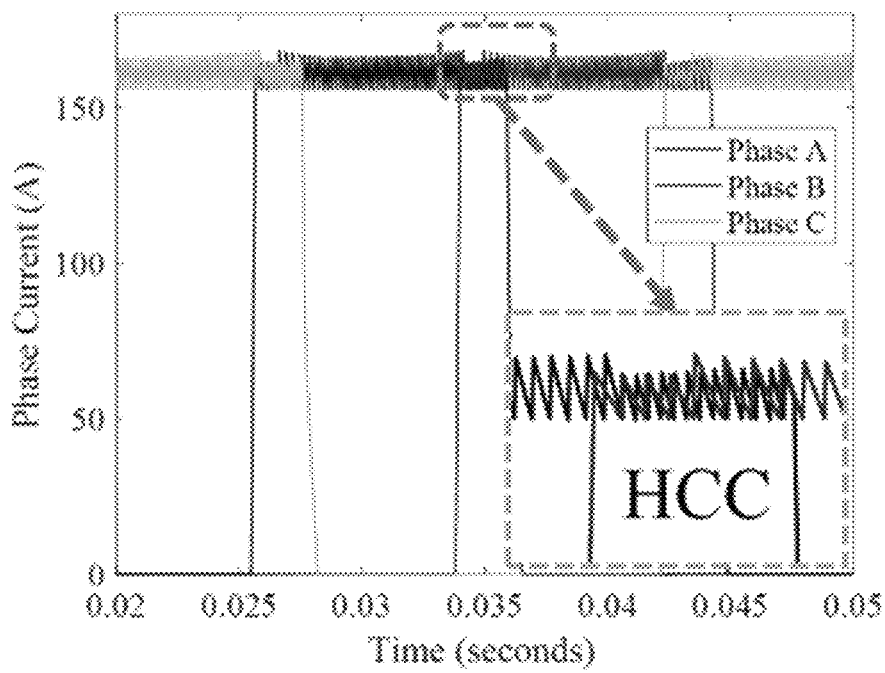
FIG. 20A is a graph showing phase currents for HCC.
Figure 20B:
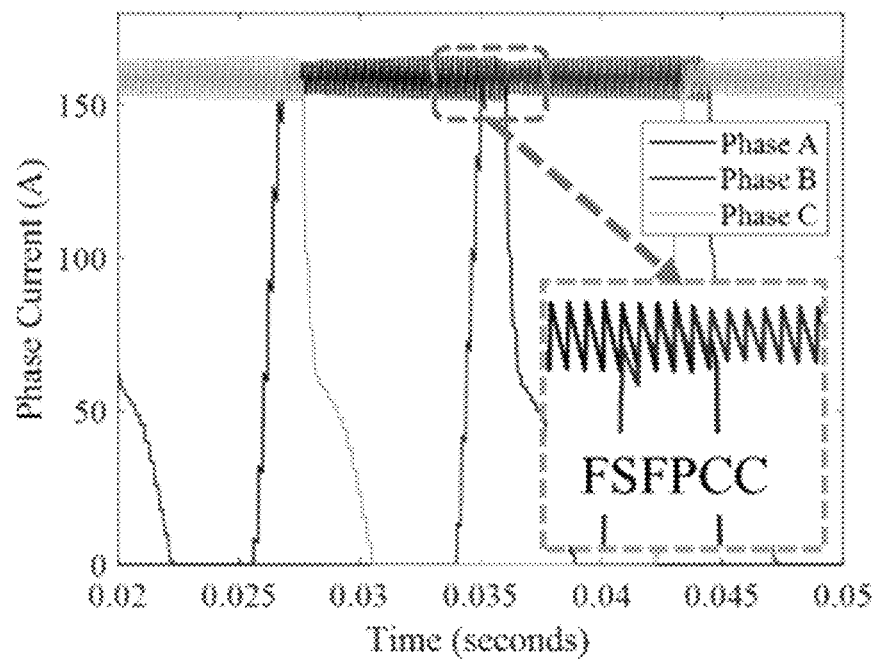
FIG. 20B is a graph showing phase currents for FSFPCC.
Figure 20C:
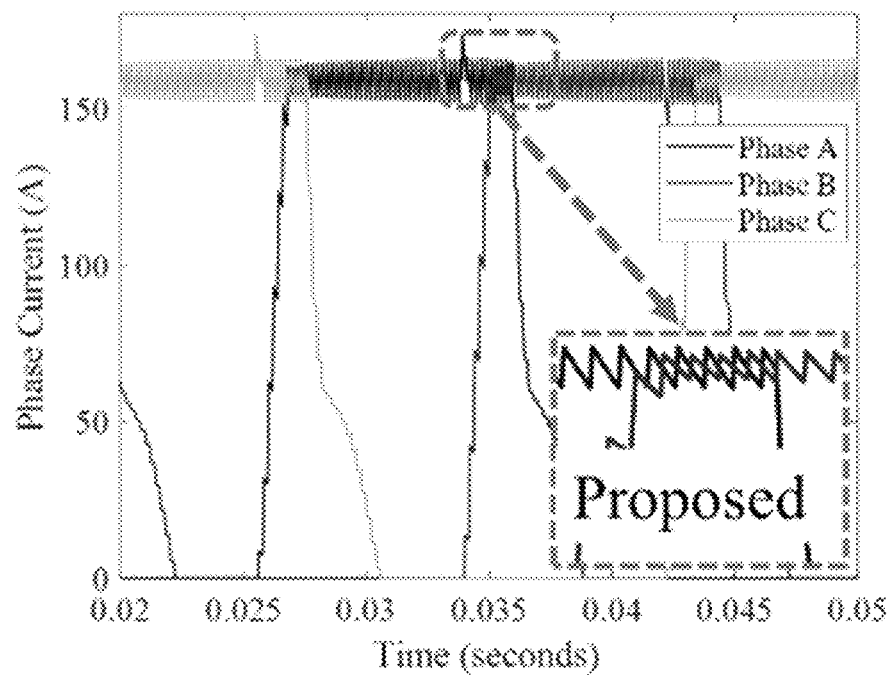
FIG. 20C is a graph showing phase currents for a method according to one or more embodiments of the present invention.

Example 2 was performed for an interleaving technique for reducing the DC-link capacitor requirement for electric motor drives. Phase currents for hysteresis current controller (HCC) and conventional fixed switching frequency predictive current control (FSFPCC) were compared to the method of one or more embodiments of the present invention. This is shown in FIGS. 20A-C, where FIG. 20A is a graph showing phase currents for HCC, FIG. 20B is a graph showing phase currents for FSFPCC, and FIG. 20C is a graph showing phase currents for a method according to one or more embodiments of the present invention.

Figure 21A:
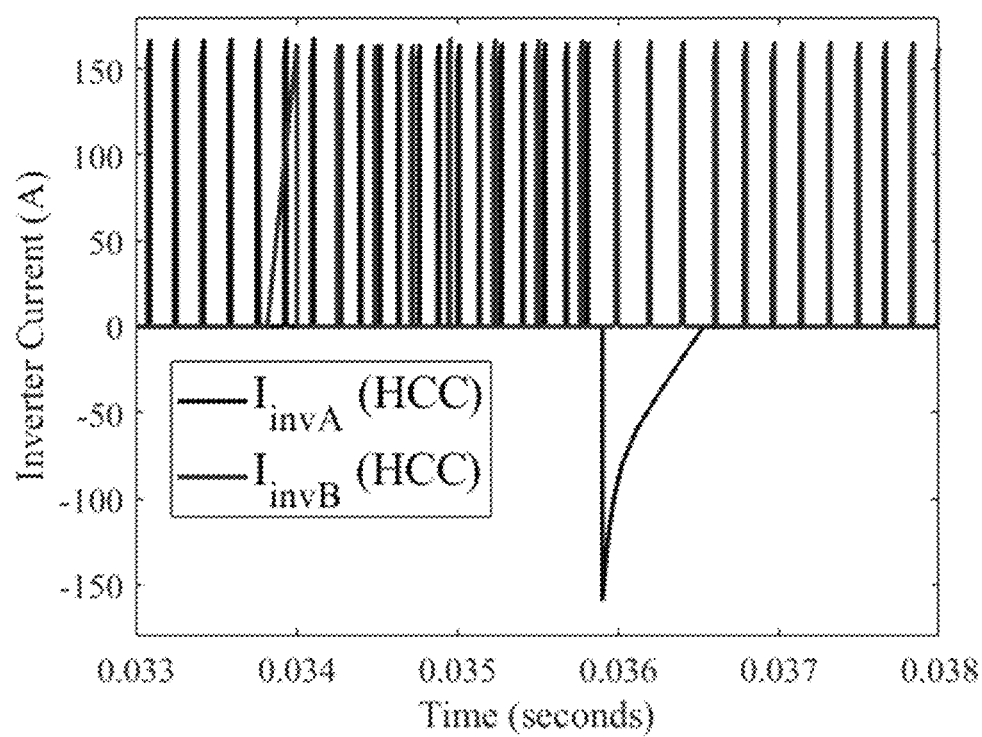
FIG. 21A is a graph showing individual inverter current for HCC.
Figure 21B:
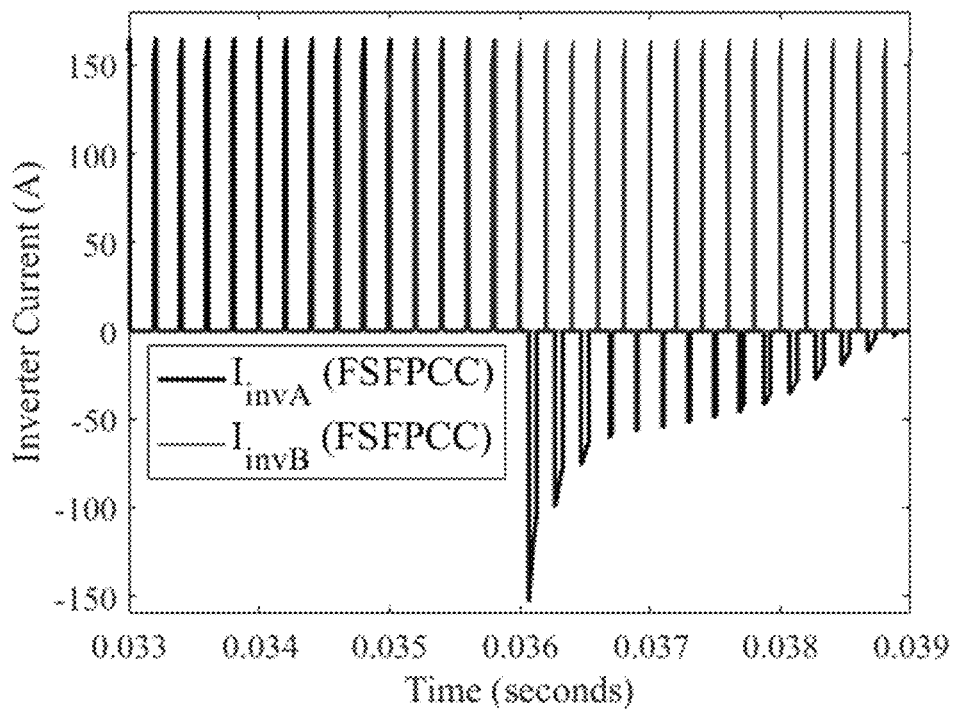
FIG. 21B is a graph showing individual inverter current for FSFPCC.
Figure 21C:
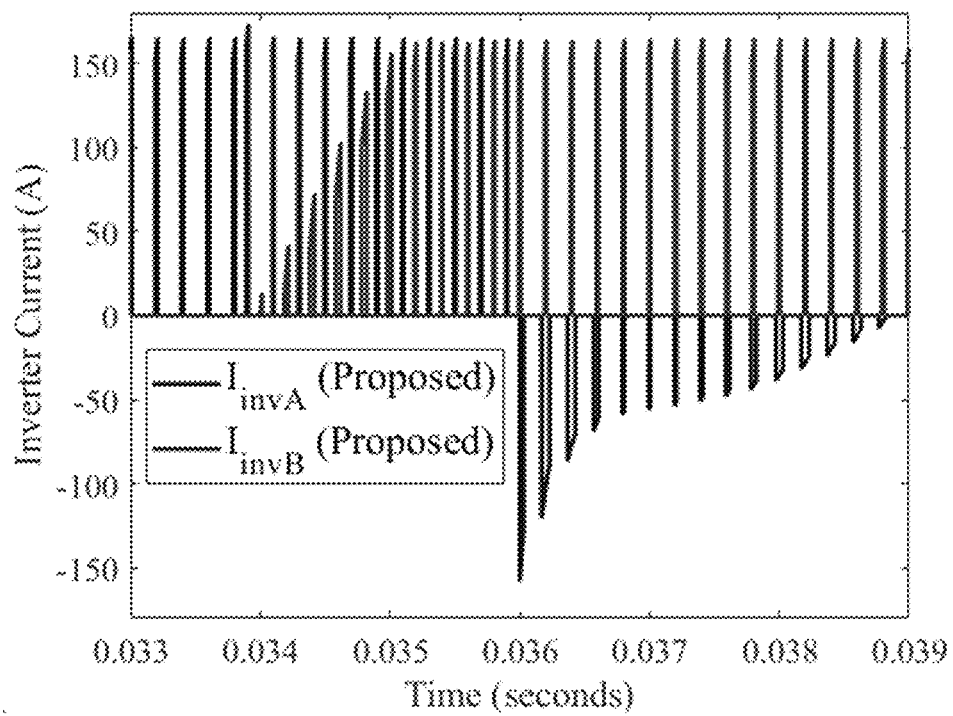
FIG. 21C is a graph showing individual inverter current for a method according to one or more embodiments of the present invention.
Figure 22A:
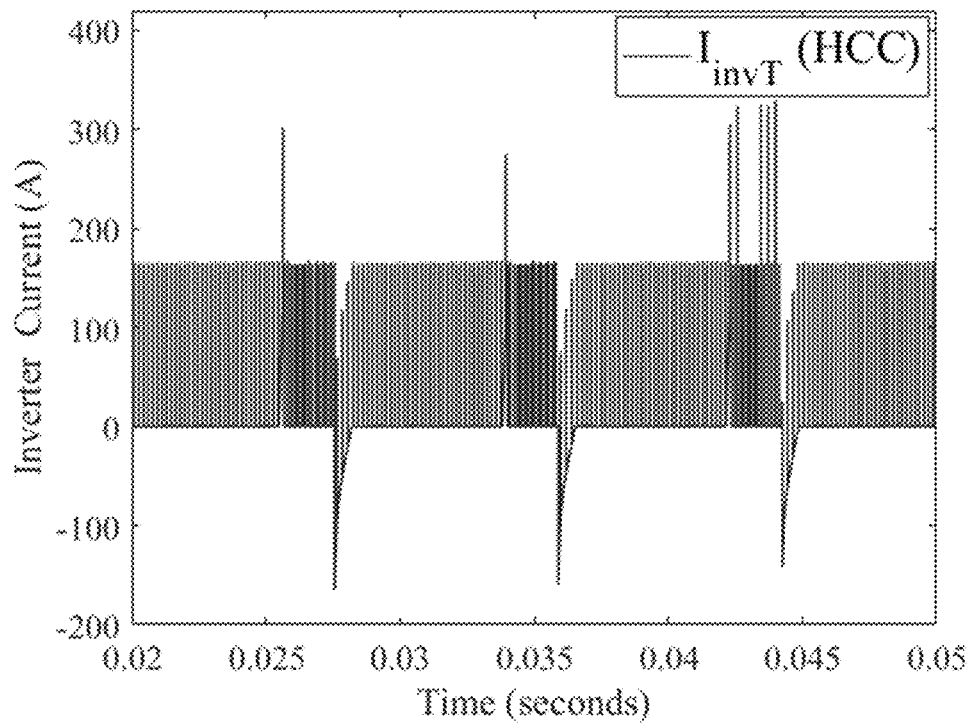
FIG. 22A is a graph showing total inverter current for HCC.
Figure 22B:
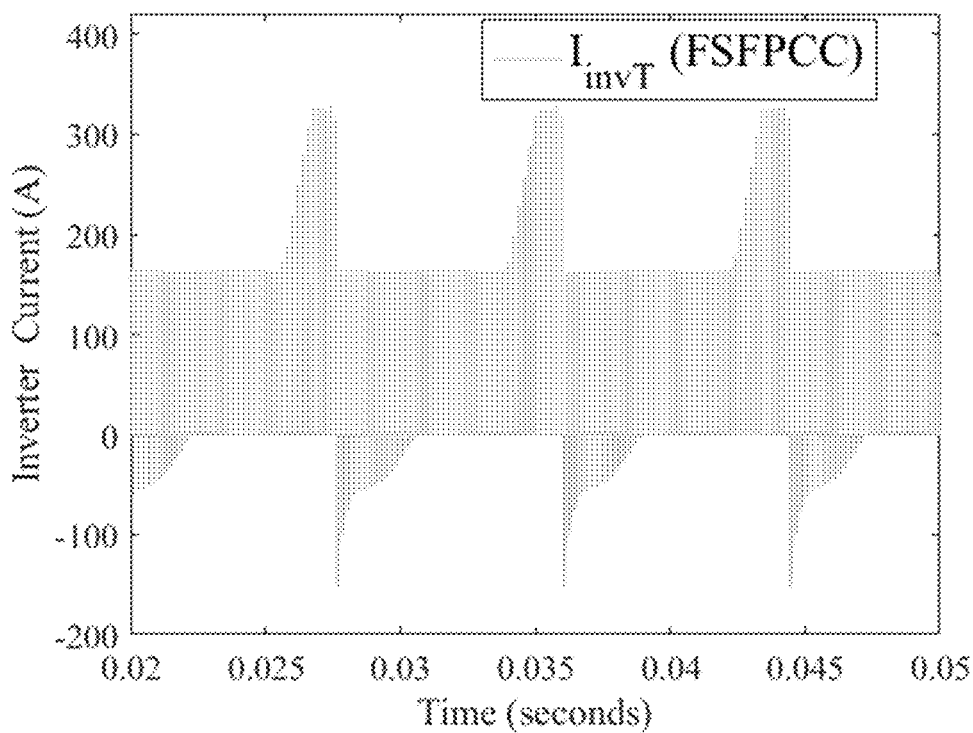
FIG. 22B is a graph showing total inverter current for FSFPCC.
Figure 22C:
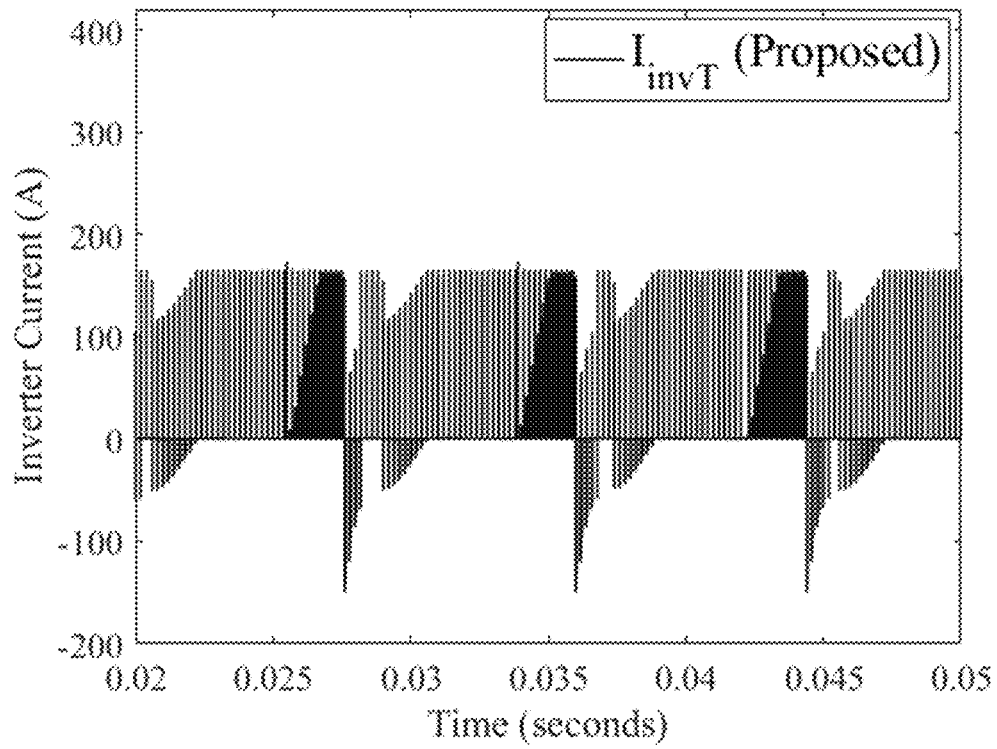
FIG. 22C is a graph showing total inverter current for a method according to one or more embodiments of the present invention.

FIG. 21A a graph showing individual inverter current for HCC and FIG. 21B is a graph showing individual inverter current for FSFPCC. FIG. 21C shows that the proposed interleaving approach ensures no overlap between the two individual inverter currents ($i_{inv_A}$, $i_{inv_B}$) when both inverter currents are positive and thus creates frequency doubling effect in the total inverter current, $i_{inv_T}$. On the other hand, when one of the inverter current $i_{inv_A}$ is negative and other one $i_{inv_B}$ is positive, the proposed method ensures complete alignment and thus enables instantaneous partial energy circulation between the phases. Complete energy circulation between the phases happens if the instantaneous average of some of the positive pulse currents are the same as the instantaneous average of the negative current pulses at the same switching cycles. FIGS. 22A-C show that the proposed method does not create additional high amplitude current pulses compared to HCC and FSFPCC. The proposed method also helps in reducing the dc-link current ripple.

Figure 23:
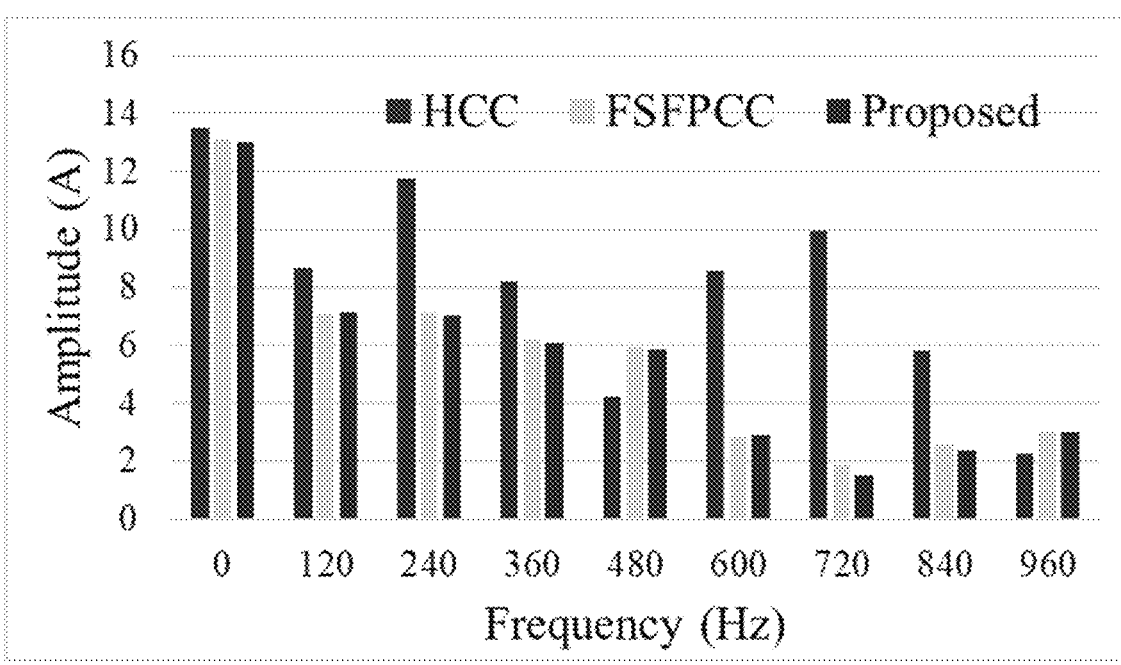
FIG. 23 is a graph showing comparative Fourier Analysis for inverter current for HCC, FSFPCC, and a method according to one or more embodiments of the present invention, showing the comparison in low frequency region.
Figure 24:
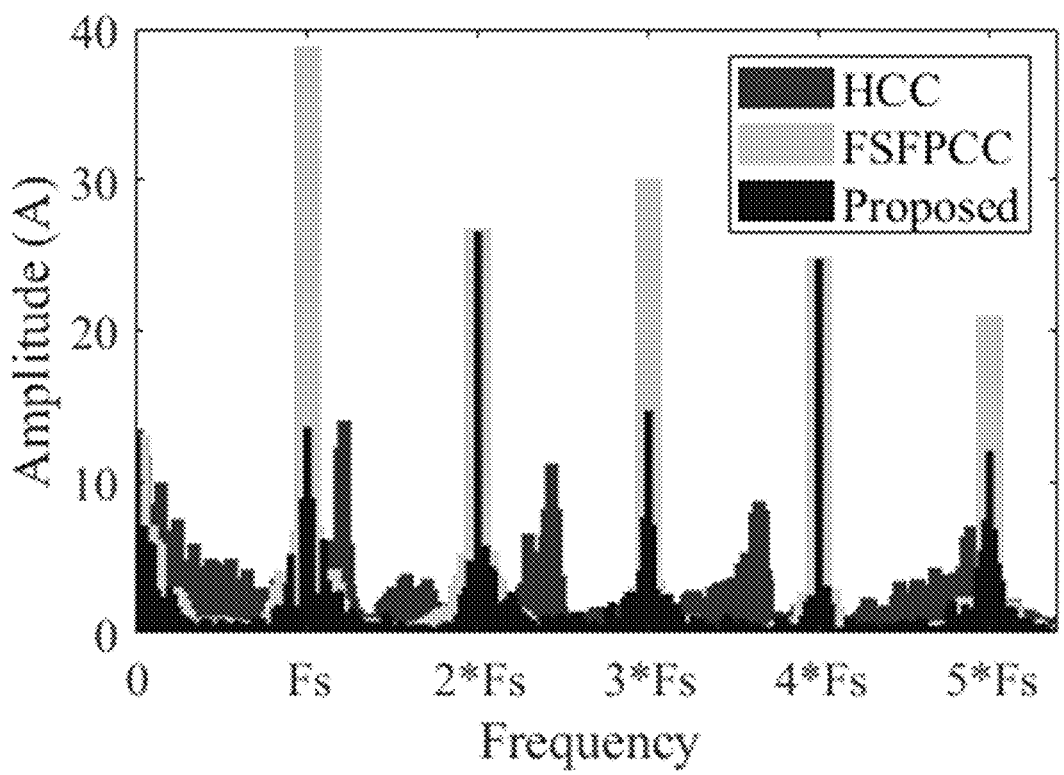
FIG. 24 is a graph showing comparative Fourier Analysis for inverter current for HCC, FSFPCC, and a method according to one or more embodiments of the present invention, showing the comparison in wide frequency region.

FIG. 23 shows the comparative Fourier Analysis for HCC, FSFPCC, and a method according to one or more embodiments of the present invention, showing the comparison in low frequency region. FIG. 24 shows the comparative Fourier Analysis for HCC, FSFPCC, and a method according to one or more embodiments of the present invention, showing the comparison in wide frequency region. For HCC, the ripple energy was concentrated in the low frequency region. FSFPCC reduced the amplitude of the low frequency contents and switching frequency ($f_{sw}$) content became dominant. On the other hand, the proposed control reduced the low frequency content same as FSFPCC, but dominant harmonic content of the inverter current was concentrated around twice switching frequency ($2f_{sw}$) as shown in FIG. 23 and FIG. 24. As capacitive impedance is lower for higher frequency, the same amount of capacitor causes higher attenuation for the proposed method.

Figure 25:
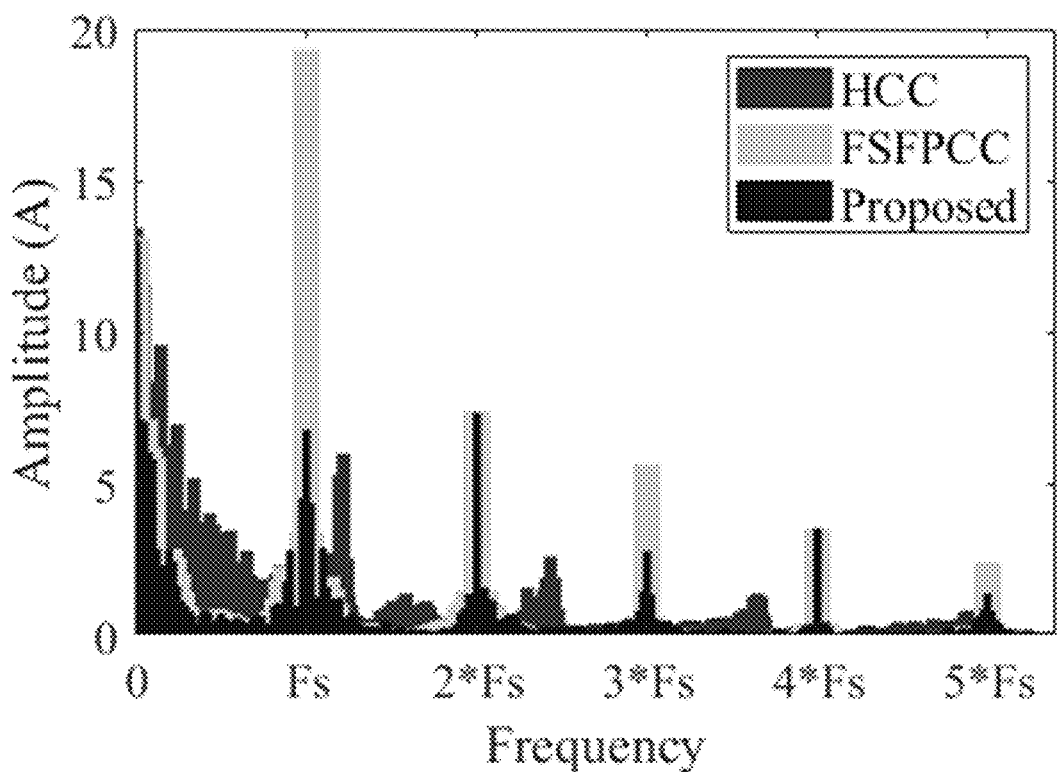
FIG. 25 is a graph showing comparative FFT for dc-link current for HCC, FSFPCC, and a method according to one or more embodiments of the present invention.

FIG. 25 is a graph showing comparative FFT for dc-link current for HCC, FSFPCC, and a method according to one or more embodiments of the present invention, using 1mF dc-link capacitor. FIG. 25 further demonstrates the effectiveness of the proposed method.

An 18 slot/12 pole SRM drive with 1 mF dc-link capacitor was implemented in MATLAB/Simulink environment to further analyze the effectiveness of the proposed interleaving control. As the dc-link current ripple is worse in low-speed region, 200 rpm and 100 Nm was chosen to compare the performance of the proposed control with HCC and FSFPCC. The peak-to-peak dc-link ripples for the HCC and FSFPCC were 218 A and 172 A respectively. On the other hand, dc-link ripple for the proposed method was 115 A. Thus, the proposed method reduced the dc-link ripple by 48% compared to HCC and by 33% compared to FSFPCC. This shows that the same amount of dc-link capacitor is more effective when the proposed method shifts the low frequency energy density to the high frequency region. The instantaneous torques were obtained and demonstrated that both FSFPCC and the proposed method showed better torque ripple performance compared to HCC maintaining the same 100 Nm average torque. The phase current RMS of the proposed method showed similar performance compared to HCC and FSFPCC methods. This means that the average torque per phase current RMS was the same for all the methods. Thus, the proposed method was producing similar output torque without causing any additional copper losses inside the machine. Therefore, the proposed method improved the dc-link ripple performance significantly without affecting the overall machine performance. The overall performance comparison between HCC, FSFPCC and proposed method is shown in Table 3.

TABLE 3

PERFORMANCE COMPARISON FOR HCC, FSFPCC AND PROPOSED METHOD FOR 200 RPM AND 100 NM OPERATING CONDITION

| Item | HCC | FSFPCC | Proposed |
|---|---|---|---|
| Average Torque (Nm) | 100 | 100 | 100 |
| Average Torque Per Ampere (Nm/A) | 0.96 | 0.96 | 0.96 |
| Torque Ripple (Nm p-p) | 50 | 30 | 30 |
| DC-Link Ripple (A p-p) | 218 | 172 | 115 |

Example 3

Mode Shape Selection

Figure 26:
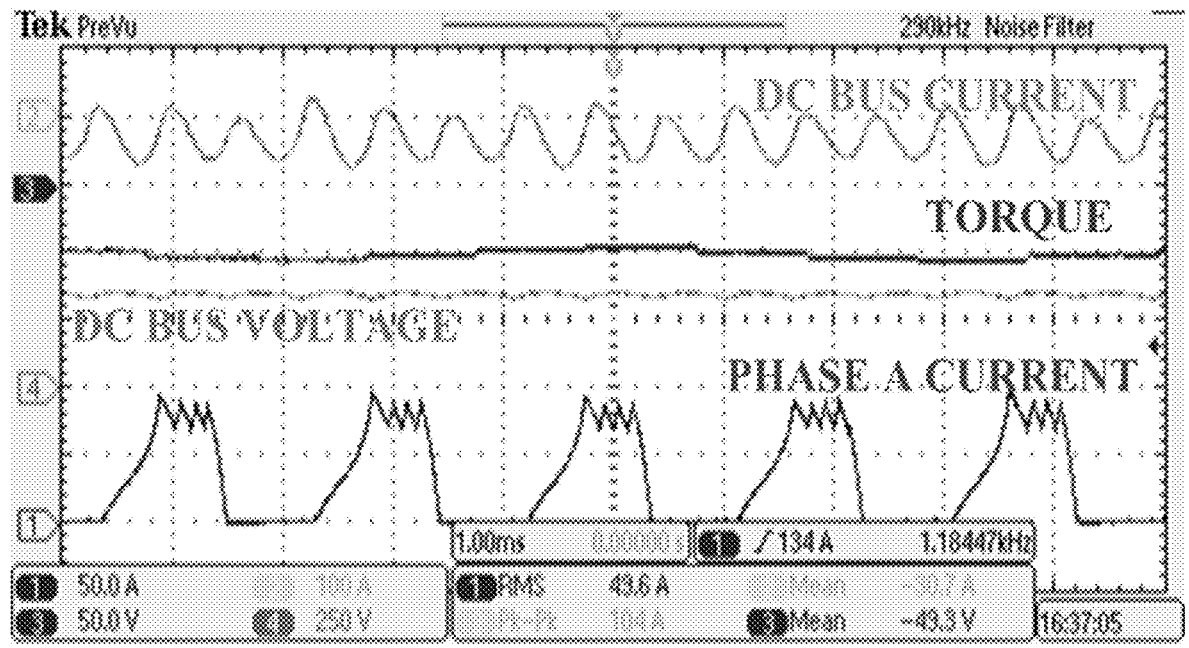
FIG. 26 is a graph showing certain details relative to a conventional control method.
Figure 27:
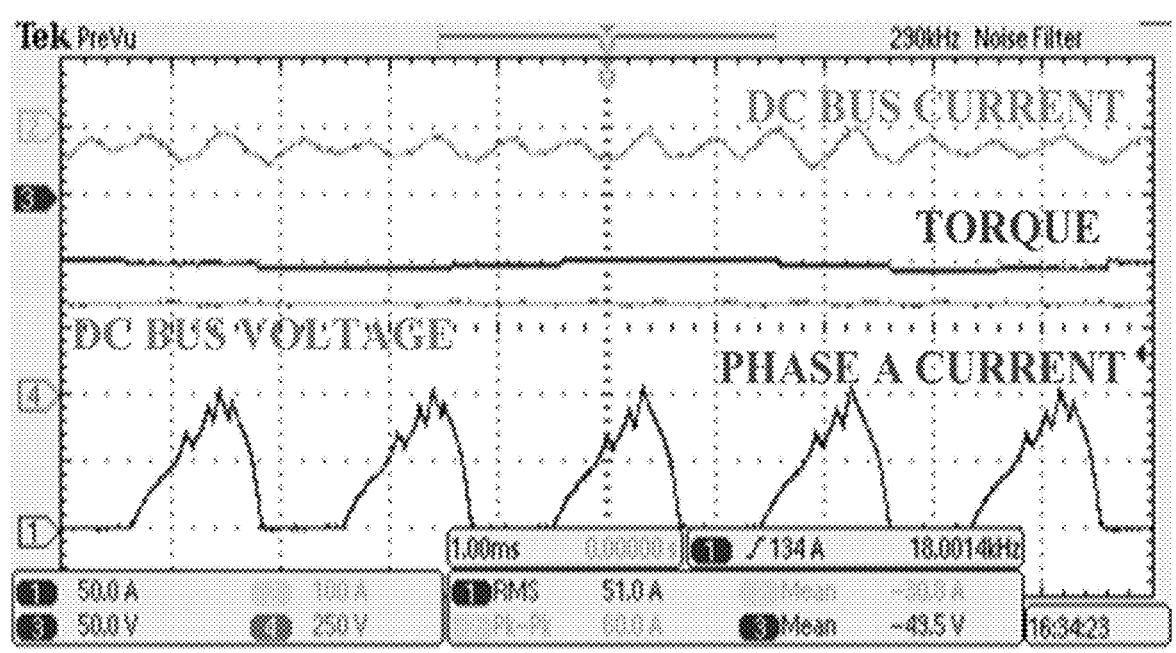
FIG. 27 is a graph showing certain details relative to a method according to one or more embodiments of the present invention.

Example 3 was performed for mode shape selection for the radial force. The proposed strategy was applied to improve the worst-case noise scenario of an 18 slot/12 pole SRM. The worst case noise was identified through an experimental run-up test. The 6th temporal order of acceleration at 2600 rpm produced the worst-case noise. The acceleration measurement was taken on the SRM housing surface and noise measurements were recorded at 1 meter from the center of the shaft. Acceleration reduction was recorded and a peak acceleration reduction of 4.7 m/s$^2$ was seen. Noise reduction was recorded and a peak noise reduction of 14.24 dBA was seen. There was also a low increase in peak current. FIG. 26 shows certain details relative to a conventional control method and FIG. 27 shows those same details relative to the proposed strategy according to one or more embodiments of the present invention.

In light of the foregoing, it should be appreciated that the present invention advances the art by providing improved methods and controllers for electric motors such as switched reluctance motors. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A method performed by a controller of an electric motor, the method comprising steps of:
generating control parameters, wherein the step of generating control parameters is selected from:
inputting a given reference torque ($T_{ref}$) and a speed command to a torque generation lookup table (LUT) such that the step of generating the control parameters includes the torque generation lookup table at the given reference torque and the speed command; or
utilizing an analytical model that includes one or more analytical equations or one or more functions;
inputting the control parameters to a DC-link current ripple, torque ripple, and radial force ripple minimization lookup table;
inputting position to the DC-link current ripple, torque ripple, and radial force ripple minimization lookup table;
generating a reference current profile from the DC-link current ripple, torque ripple, and radial force ripple minimization lookup table; and
inputting the reference current profile to the electric motor.

2. The method of claim 1, wherein the reference current profile is an optimal reference current profile.

3. The method of claim 1, wherein the control parameters include commutation angles $\theta_{on}$ and $\theta_{off}$ and a reference current $I_{ref}$.

4. The method of claim 1, wherein the step of generating the reference current profile is offline prior to operation of the electronic motor.

5. The method of claim 1, wherein the step of inputting the reference current profile includes injecting an optimum current waveform and a constant reference current.

6. The method of claim 1, wherein the step of generating the reference current profile includes a plurality of iterative steps.

7. The method of claim 6, wherein the step of generating the reference current profile includes current harmonic injection.

8. The method of claim 7, wherein the current harmonic injection includes
  providing DC-link current, torque, and radial force inputs to a band pass filter (BPF) to thereby obtain DC-link current ripple, torque ripple, and radial force ripple outputs;
  providing the radial force input to a Fast Fourier transform (FFT) block to thereby provide harmonic contents of the radial force; and
  providing the DC-link current ripple, torque ripple, radial force ripple outputs and the harmonic contents of the radial force to a global multi-objective optimization step.

9. The method of claim 8, wherein the global multi-objective optimization step includes a function defined by Formula (23):

$$\min R(C(A_m,\varphi_m)) = w_1 Idc_{ripple}(C(A_m,\varphi_m)) + w_2 T_{ripple}(C(A_m,\varphi_m)) + w_3 F_{ripple}(C(A_m,\varphi_m)) + w_4 FFT_{fi}(F_{ripple}(C(A_m,\varphi_m)))$$ Formula (23)

where $C(A_m,\varphi_m)$ is the decision variables which has current injection harmonic coefficients; $w_1$, $w_2$, $w_3$, and $w_4$ are weighting factors; $FFT_{fi}$ is the radial force harmonic component at frequency $f_i$, $Idc_{ripple}$ is DC-link current ripple, $T_{ripple}$ is torque ripple, and $F_{ripple}$ is radial force ripple, wherein the global multi-objective optimization step includes minimizing the function of Formula (23) to thereby minimize the DC-link current ripple, torque ripple, and radial force ripple.

10. The method of claim 1, wherein the step of generating the reference current profile includes control based current profiling.

11. The method of claim 10, wherein the control based current profiling includes
  providing DC-link current, torque, and radial force inputs to a band pass filter (BPF) to thereby obtain DC-link current ripple, torque ripple, and radial force ripple outputs, and
  providing the DC-link current ripple, torque ripple, and radial force ripple outputs to a global multi-objective optimization step.

12. The method of claim 11, wherein the global multi-objective optimization step includes a fitness function defined by Formula (9):

$$F_{fitness} = w_1 f_1 + w_2 f_2 + w_3 f_3$$ Formula (9)

where $w_1$, $w_2$, and $w_3$ are user-input weights for objectives of the DC-link current ripple, torque ripple, and radial force ripple, respectively, and $f_1$, $f_2$ and $f_3$ are fitness values for objectives of the DC-link current ripple, torque ripple, and radial force ripple, respectively, wherein $w_1$, $w_2$, and $w_3$ and $f_1$, $f_2$ and $f_3$ include initial values, and wherein $w_1$, $w_2$, and $w_3$ and $f_1$, $f_2$ and $f_3$ can be modified from the initial values during operation of the electric motor.

13. The method of claim 12, wherein the modification of $w_1$, $w_2$, and $w_3$ and $f_1$, $f_2$ and $f_3$ is based on a different operating speed or a different torque condition, and wherein the global multi-objective optimization step includes minimizing the fitness function to thereby minimize the DC-link current ripple, torque ripple, and radial force ripple.

14. The method of claim 1, wherein the electric motor is a switched reluctance motor, the method further comprising a step of interleaved fixed switching frequency predictive current control that includes a phase shift ($\delta_{AB}$) between carrier signals of upper switches in a Phase A and a Phase B being kept at 180° to implement an interleaving strategy when an operating region of the switched reluctance motor is the Phase A and Phase B region.

15. The method of claim 14, wherein the step of interleaved fixed switching frequency predictive current control further includes
  a phase shift ($\delta_{BC}$) between the carrier signals of the upper switches in the Phase B and a Phase C being kept at 180° to implement an interleaving strategy when the operating region of the switched reluctance motor is the Phase B and Phase C region; and
  a phase shift ($\delta_{CA}$) between the carrier signals of the upper switches in the Phase C and the Phase A being kept at 180° to implement an interleaving strategy when the operating region of the switched reluctance motor is the Phase C and Phase A region.

16. The method of claim 1, further comprising a step of mode shape selection for the radial force to thereby achieve improved radial force control.

17. The method of claim 16, wherein the step of mode shape selection includes
  calculating spatial and temporal distribution of airgap force during dynamic simulations through an additional lookup table;
  performing 1D (spatial)-FFT to identify a dominant spatial order of the airgap force;
  determining temporal orders associated with the dominant spatial order, wherein the temporal orders include Mode 0 and Mode 6;
  feeding the temporal orders through a proportional integral (PI) controller into a reference current generation; and
  optimizing gains of the PI controller through a multi-physics vibration synthesis.

18. The method of claim 1, wherein the electric motor is selected from a switched reluctance motor, a synchronous reluctance motor, and a permanent magnet motor.

19. A method performed by a controller of a switched reluctance motor, the method comprising a step of interleaved fixed switching frequency predictive current control including
  a phase shift ($\delta_{AB}$) between carrier signals of upper switches in a Phase A and a Phase B being kept at 180° to implement an interleaving strategy when an operating region of the switched reluctance motor is the Phase A and Phase B region;
  a phase shift ($\delta_{BC}$) between the carrier signals of the upper switches in the Phase B and a Phase C being kept at 180° to implement an interleaving strategy when the operating region of the switched reluctance motor is the Phase B and Phase C region; and
  a phase shift ($\delta_{CA}$) between the carrier signals of the upper switches in the Phase C and the Phase A being kept at 180° to implement an interleaving strategy when the operating region of the switched reluctance motor is the Phase C and Phase A region.

20. A method performed by a controller of an electric motor, the method comprising a step of mode shape selection including
  calculating spatial and temporal distribution of airgap force during dynamic simulations through a lookup table;
  performing 1D (spatial)-FFT to identify a dominant spatial order of the airgap force;
  determining temporal orders associated with the dominant spatial order, wherein the temporal order include Mode 0 and Mode 6;

feeding the temporal orders through a proportional integral (PI) controller into a reference current generation; and optimizing gains of the PI controller through a multiphysics vibration synthesis.

\* \* \* \* \*